United States Patent
Sugihara et al.

(10) Patent No.: US 7,324,862 B2
(45) Date of Patent: Jan. 29, 2008

(54) QUALITY CONTROL APPARATUS AND CONTROL METHOD OF THE SAME, AND RECORDING MEDIUM RECORDED WITH QUALITY CONTROL PROGRAM

(75) Inventors: Shiro Sugihara, Kyoto (JP); Toru Fujii, Kyoto (JP); Mineo Sono, Kyoto (JP)

(73) Assignee: Omron Corporation, Kyoto-Shi (JP)

( * ) Notice: Subject to any disclaimer, the term of this patent is extended or adjusted under 35 U.S.C. 154(b) by 252 days.

(21) Appl. No.: 11/116,457

(22) Filed: Apr. 28, 2005

(65) Prior Publication Data

US 2005/0246045 A1  Nov. 3, 2005

(30) Foreign Application Priority Data

Apr. 30, 2004  (JP) ............................ 2004-136409
Oct. 20, 2004  (JP) ............................ 2004-306159

(51) Int. Cl.
*G06F 19/00* (2006.01)
(52) U.S. Cl. ..................... 700/109; 702/84; 702/182
(58) Field of Classification Search ............... 700/109, 700/110; 702/81, 84, 182
See application file for complete search history.

(56) References Cited

U.S. PATENT DOCUMENTS

| | | | |
|---|---|---|---|
| 5,706,213 A | | 1/1998 | Takakura et al. |
| 6,574,522 B1* | | 6/2003 | Douglas ..................... 700/109 |
| 2002/0077761 A1* | | 6/2002 | Haraburda et al. ........... 702/82 |
| 2004/0225396 A1* | | 11/2004 | Maeritz ...................... 700/109 |
| 2005/0065752 A1* | | 3/2005 | Shafer et al. ................ 702/183 |
| 2005/0251278 A1* | | 11/2005 | Popp ........................... 700/110 |

FOREIGN PATENT DOCUMENTS

| | | |
|---|---|---|
| JP | 63-120060 | 5/1988 |
| JP | 03-228531 | 10/1991 |
| JP | 4-188301 | 7/1992 |
| JP | 6-110504 | 4/1994 |
| JP | 7-141005 | 6/1995 |
| JP | 09-160982 | 6/1997 |
| JP | 2000-091178 | 3/2000 |
| JP | 2000-094271 | 4/2000 |
| JP | 2000-334641 | 12/2000 |
| JP | 2003-241819 | 8/2003 |
| WO | WO 02/29733 A | 4/2002 |

OTHER PUBLICATIONS

G. Taguchi et al., Hinshitsu Kogaku Koza 1/Kaihatsu-Sekki Dankai no Hinshitsu Kogaku, Nihon Kikaku Kyokai, 1998, pp. 28-65.

* cited by examiner

Primary Examiner—Leo Picard
Assistant Examiner—Sheela Rao
(74) Attorney, Agent, or Firm—Foley & Lardner LLP

(57) ABSTRACT

Various items of data collected at different process steps are associated on production sites where traceability is hard to conduct. A quality control apparatus controls a manufacturing process in order to manufacture products of predetermined quality, including a data storing part which collects measurement data measured by multiple devices disposed in a manufacturing process and stores the collected measurement data along with measured time or collected time; and a scheduler which associates the measurement data of the devices with each other in consideration of dead time generated between the devices at measured time or collected time.

28 Claims, 12 Drawing Sheets

FIG. 4A

| FIRST CONTROL TARGET | | | |
|---|---|---|---|
| PRODUCTION NUMBER | MEASURED VALUE | SET VALUE | ACQUIRED TIME |
| 1 | 2.2357 | 2.4000 | 8:00:02 |
| 2 | 2.5434 | 2.4000 | 8:00:04 |
| ... | ... | ... | ... |

FIG. 4B

| SECOND CONTROL TARGET | | | |
|---|---|---|---|
| PRODUCTION NUMBER | MEASURED VALUE | SET VALUE | ACQUIRED TIME |
| 1 | 0.7873 | 0.7800 | 8:00:27 |
| 2 | 0.7825 | 0.7800 | 8:00:28 |
| ... | ... | ... | ... |

FIG. 4C

| INTERMEDIATE CHARACTERISTICS | | | |
|---|---|---|---|
| PRODUCTION NUMBER | INTERMEDIATE CHARACTERISTIC A | INTERMEDIATE CHARACTERISTIC B | ACQUIRED TIME |
| 1 | 0.0347 | 1.7580 | 8:06:05 |
| 2 | 0.0442 | 1.7928 | 8:06:07 |
| ... | ... | ... | ... |

FIG. 4D

| FINAL CHARACTERISTICS | | | |
|---|---|---|---|
| PRODUCTION NUMBER | FINAL CHARACTERISTIC A | FINAL CHARACTERISTIC B | ACQUIRED TIME |
| 1 | 0.0702 | 1.6237 | 8:46:46 |
| 2 | 0.0789 | 1.6302 | 8:46:48 |
| ... | ... | ... | ... |

FIG. 11

CONTROL TARGET 2

| SWITCHING AMOUNT | -0.010 | -0.005 | 0.000 | 0.005 | 0.010 |
|---|---|---|---|---|---|
| -0.006 | $X_{a,-2,-2}$ | $X_{a,-2,-1}$ | $X_{a,-2,0}$ | $X_{a,-2,1}$ | $X_{a,-2,2}$ |
| -0.003 | $X_{a,-1,-2}$ | $X_{a,-1,-1}$ | $X_{a,-1,0}$ | $X_{a,-1,1}$ | $X_{a,-1,2}$ |
| 0.000 | $X_{a,0,-2}$ | $X_{a,0,-1}$ | $X_{a,0,0}$ | $X_{a,0,1}$ | $X_{a,0,2}$ |
| 0.003 | $X_{a,1,-2}$ | $X_{a,1,-1}$ | $X_{a,1,0}$ | $X_{a,1,1}$ | $X_{a,1,2}$ |
| 0.006 | $X_{a,2,-2}$ | $X_{a,2,-1}$ | $X_{a,2,0}$ | $X_{a,2,1}$ | $X_{a,2,2}$ |

(CONTROL TARGET 1, vertical axis label)

FIG. 12

| CONTROL TARGET 1 = 0.003, CONTROL TARGET 2 = 0.010 | | | | | | |
|---|---|---|---|---|---|---|
| PRODUCTION NUMBER | INTERMEDIATE CHARACTERISTIC A | PASSED/FAILED | INTERMEDIATE CHARACTERISTIC B | PASSED/FAILED | INTERMEDIATE CHARACTERISTIC C | PASSED/FAILED |
| 92 | 0.0347 | | 1.7580 | | 1.3234 | |
| 93 | 0.0442 | NG | 1.7928 | NG | 1.4332 | NG |
| 94 | 0.0345 | | 1.7772 | | 1.3975 | |
| 95 | 0.0374 | NG | 1.7669 | | 1.2256 | NG |
| 96 | 0.0352 | | 1.8234 | NG | 1.3245 | |

FIG. 13

CONTROL TARGET 2

| | SWITCHING AMOUNT | -0.010 | -0.005 | 0.000 | 0.005 | 0.010 |
|---|---|---|---|---|---|---|
| CONTROL TARGET 1 | -0.006 | 105 | 94 | 82 | 43 | 32 |
| | -0.003 | 97 | 79 | 67 | 30 | 27 |
| | 0.000 | 81 | 65 | 54 | 24 | 19 |
| | 0.003 | 61 | 53 | 48 | 23 | 15 |
| | 0.006 | 55 | 46 | 45 | 25 | 18 |

FIG. 14

| TYPE | EXEMPLARY CAUSE | CONTENTS |
|---|---|---|
| OUTLIER | MEASUREMENT ERROR | SUDDENLY DEVIATED FROM THE NORMAL MEASURED VALUE |
| RE-MEASUREMENT | MEASUREMENT FAILED | THE MEASURED VALUE BEFORE REMEASUREMENT IS HIGHLY LIKELY TO BE ABNORMAL |
| PUTTING BACK | FIX THE DEFECTIVE PRODUCT | ITS PROCESS STEPS ARE REPEATED |
| REMOVED PRODUCT | REMOVE THE DEFECTIVE PRODUCT | REMOVE USELESS ONES FOR SUBSEQUENT PROCESS STEPS |

FIG. 15

| TYPE | PREVIOUS PROCESS STEP | SUBSEQUENT PROCESS STEP | REASON |
|---|---|---|---|
| OUTLIER | X | X | SINCE IT IS OBVIOUSLY AN ABNORMAL MEASURED VALUE, IT IS INVALID UNCONDITIONALLY |
| RE-MEASUREMENT | X | X | SINCE THE MEASURED VALUES ARE OVERLAPPED WITH EACH OTHER, THE MEASURED VALUE BEFORE REMEASUREMENT IS INVALID UNCONDITIONALLY |
| PUTTING BACK | X | O | IT CANNOT BE ASSOCIATED WITH THE PREVIOUS PROCESS STEP, WHEREAS IT CAN BE ASSOCIATED WITH THE SUBSEQUENT PROCESS STEP |
| REMOVED PRODUCT | O | X | IT CAN BE ASSOCIATED WITH THE PREVIOUS PROCESS STEP, AND IT DOES NOT EXIST IN THE SUBSEQUENT PROCESS STEP |

X: INVALID DATA, O: VALID DATA

QUALITY CONTROL APPARATUS AND CONTROL METHOD OF THE SAME, AND RECORDING MEDIUM RECORDED WITH QUALITY CONTROL PROGRAM

BACKGROUND OF THE INVENTION

1. Field of the Invention

The present invention relates to a quality control apparatus for controlling a manufacturing process and a control method of the same, a quality control program, and a recording medium recorded with the program for manufacturing products of predetermined quality.

2. Description of the Related Art

Traditionally, an effort to improve the quality of products is taken, and various quality control methods are proposed.

For example, in order to realize traceability, a management method is proposed in which identification codes such as bar codes are assigned to intermediate products for products and to bases on which the intermediate product is placed. Furthermore, in order to realize traceability, an identification method is proposed in which intermediate products are identified in order of the intermediate products to be put in each of manufacturing process steps.

Moreover, a method is proposed in which the cause-and-effect relationship between controllable factors and product characteristics is fully comprehended to specify the controllable factors for obtaining optimum product characteristics. Besides, a method is proposed in which the entire conditions of controllable factors are fixed to maintain product characteristics (for example, see Patent Documents 2 and 3).

In addition, a method is proposed in which indicators for individual product characteristics are provided to do comprehensive evaluation from these indicators. Furthermore, a method is proposed in which it is determined whether product characteristics is passed or failed at the final process step in production and controlled parameters are adjusted in manufacturing process steps when a product is determined as a defective (for example, see Patent Document 1).

Patent Document 1: JP-A-7-141005 (published on Jun. 2, 1995)

Patent Document 2: JP-A-6-110504 (published on Apr. 22, 1994)

Patent Document 3: JP-A-4-188301 (published on Jul. 6, 1992)

Non-patent Document 1: TAGUCHI Gen'ichi, and YOSHIZAWA Masataka, Hinshitsu Kogaku Koza 1/Kaihatsu-Sekkie Dankai no Hinshitsu Kogaku, Nihon Kikaku Kyokai, 1988

However, in the method that assigns the identification code for management, there is a problem that production costs are increased. Furthermore, defectives are often drawn, reworked, and put back in manufacturing process steps. On this account, the method that identifies the intermediate products in order of the intermediate products does not always identify the intermediate products correctly.

Moreover, since many controllable factors exist, many verification experiments are required to fully comprehend the cause-and-effect relationship between the controllable factors and the product characteristics. Besides, the more complicated the cause-and-effect relationship is, the more difficult the full comprehension is. Furthermore, even though all the conditions of the controllable factors are fixed, an unobservable change in factors over time can varies the product characteristics.

Moreover, in the method that performs comprehensive evaluation from the indicators for the individual product characteristics, since the product characteristics often have a trade-off relationship each other, it is difficult to perform comprehensive evaluation. Besides, in the method that determines whether the product characteristics are passed or failed at the final process step in production, defectives are continuously fabricated until the final process step, and thus unnecessary production time and materials are increased. Furthermore, the intervals between control feedback loops are also increased.

SUMMARY OF THE INVENTION

The invention has been made in view of the problems. An object is to provide a quality control apparatus which associates various items of data with each other that are collected at different process steps in production sites where traceability is difficult to do.

In order to solve the problem, a quality control apparatus according to the invention is a quality control apparatus which controls a manufacturing process in order to manufacture products of predetermined quality, the apparatus including:

a storing module which collects measurement data measured by multiple measuring devices disposed in a manufacturing process and stores the collected measurement data along with measured time or collected time; and an associating module which associates the measurement data of the measuring devices with each other in consideration of dead time generated between the measuring devices at measured time or collected time.

An intermediate product measured by a certain device is to be measured by the subsequent device at the time after dead time has roughly elapsed from when the intermediate product was measured. Therefore, the time measured by each of the measuring devices or the time collected by each of the measuring devices can be roughly associated by the dead time.

Thus, according to the configuration, since the collected measurement data is associated with the measured time or collected time, the associating module roughly associates the measured time or collected time by the dead time generated between the measuring devices, and therefore the measurement data of the measuring devices can be associated with each other.

Furthermore, the dead time is used only by the associating module, and does not influence the data stored in the storing module even though the dead time is changed. Therefore, the dead time can be changed easily.

Moreover, it is acceptable that the associating module associates given numbers of items of measurement data of the multiple measuring devices with each other. In this case, a set formed of the given number of items of measurement data is formed in each of the measuring devices, and the sets in the multiple measuring devices are associated with each other. Therefore, since the number of items of measurement data included in the individual associated sets is constant, the accuracy of statistics of each set can be nearly matched. Besides, the set is formed based on the number of measurements, not on a time period measured by the measuring device, and thus the individual sets can be properly associated with each other even though a certain process step in a manufacturing process is stopped for a long time and then started, for example.

In addition, desirably, when improper measurement data is included in the measurement data to be associated with each other, the associating module stops association of the improper measurement data with the measurement data that is the measurement data measured by the other measuring device and corresponds to the improper measurement data.

Here, for the improper measurement data, the following is named: the case where the measurement value is an outlier that is greatly deviated from a normal value, the case where a device remeasures the same intermediate product because of failed measurement, the case where the intermediate product determined as out-of-specification in intermediate inspection is put back to the process step on the upstream side, and the case where the intermediate product determined as out-of-specification in intermediate inspection is removed right after its inspection.

The improper measurement data causes the reduced accuracy in conducting statistical processes. Thus, according to the configuration, since the improper measurement data is not used for the association, the accuracy of the statistical processes can be prevented from being reduced.

Furthermore, when the intermediate product is put back, relating to the intermediate product put back, there is the measurement data of the measuring device at the process step where the intermediate product is put back and on the downstream side thereof, but there is no measurement data of the measuring device on the upstream side of the process step where the intermediate product is put back. Therefore, desirably, when an intermediate product is put back at a certain process step in a manufacturing process, the associating module stops association of measurement data relating to the intermediate product of the measuring device on an upstream side of the process step with measurement data relating to the intermediate product of the measuring device at the process step and on a downstream side thereof.

Moreover, when the intermediate product is removed right after its inspection, relating to the intermediate product to be removed, there is the measurement data of the measuring device at the process step where the intermediate product is removed and on the upstream side thereof, but there is no measurement data of the measuring device on the downstream side of the process step where the intermediate product is removed. Thus, desirably, when an intermediate product is removed at a certain process step in a manufacturing process, the associating module stops association of measurement data of the measuring device on a downstream side of the process step with measurement data relating to the intermediate product of the measuring device at the process step and on an upstream side thereof.

A quality control apparatus according to the invention is a quality control apparatus which controls a manufacturing process in order to manufacture products of predetermined quality, the apparatus including:

a storing module which collects and stores intermediate characteristic data of an intermediate product measured by an intermediate characteristic measuring device and final characteristic data of a completed product measured by a final characteristic measuring device;

a specification limit generating module which generates an intermediate characteristic specification limit set to the intermediate characteristic measuring device based on a data distribution of the final characteristic data stored in the storing module and a final characteristic specification limit set to the final characteristic measuring device; and a specification limit setting control module which controls the intermediate characteristic measuring device so as to set the generated specification limit generated by the specification limit generating module.

Here, the intermediate characteristic measuring device inspects the intermediate characteristics of the intermediate product in the middle of production, and determines whether the intermediate product is passed or failed based on the intermediate characteristic specification limit. Since the defective is removed in the middle of production by using the intermediate characteristic measuring device, unnecessary production time for the defective can be eliminated and the intervals between control feedback loops can be reduced.

Then, according to the configuration, since the specification limit generating module switches the intermediate characteristic specification limit based on the final characteristic of the completed product, the intermediate characteristic specification limit can be automatically adjusted even though various parameters in the manufacturing process are varied.

Furthermore, desirably, the specification limit generating module generates the intermediate characteristic specification limit based on a differential between a mean value of the data distribution of the final characteristic data and the final characteristic specification limit. Moreover, desirably, the specification limit generating module generates the intermediate characteristic specification limit so that a ratio of a differential between a mean value of a data distribution of the intermediate characteristic data stored in the storing module and the intermediate characteristic specification limit with respect to the differential between the mean value of the data distribution of the final characteristic data and the final characteristic specification limit is a ratio of a variation value of the data distribution of the intermediate characteristic data with respect to a variation value of the data distribution of the final characteristic data.

Here, the variation value of the data distribution indicates the degree of variations in the data distribution. For example, standard deviation, variance, and half width are named.

Besides, desirably, the specification limit generating module further generates the intermediate characteristic specification limit based on a safety factor. In this case, the intermediate product can be efficiently removed based on the intermediate characteristic specification limit. In addition, the safety factor can be also set based on empirical rules, but desirably, it is calculated based on discard cost when the completed product is removed based on the final characteristic specification limit and discard cost when the intermediate product is removed based on the intermediate characteristic specification limit.

Furthermore, desirably, the storing module stores the intermediate characteristic data and the final characteristic data along with measured time or collected time, the quality control apparatus further includes:

an associating module which associates the intermediate characteristic data with the final characteristic data in consideration of dead time generated between the intermediate characteristic measuring device and the final characteristic measuring device at measured time or collected time. In this case, since the collected intermediate characteristic data and the final characteristic data are associated with measured time or collected time, the associating module roughly associates the measured time or collected time by the dead time generated between the intermediate characteristic measuring device and the final characteristic measuring device. Thus, the intermediate characteristic data is associated with the final characteristic data.

Moreover, desirably, the specification limit generating module generates a subsequent specification limit by using the intermediate characteristic data and the final characteristic data collected by the storing module after a given time period has elapsed from when the specification limit setting control module controlled the intermediate characteristic measuring device. Generally, when the set value of the device is switched, a slight time lag is generated until switching is completed. Therefore, in the case above, since data in the middle of switching is not used, more accurate control is possible.

A quality control apparatus according to the invention is a quality control apparatus which controls a control target device disposed in a manufacturing process in order to manufacture products of predetermined quality, the apparatus including:

a storing module which collects and stores a set value of a control value set as a target value to the control target device, control data that is a measurement value of the control value measured by the control target device with respect to the set value of the control value; and intermediate characteristic data of an intermediate product measured by an intermediate characteristic measuring device;

an intermediate characteristic estimating module which estimates a variation in a data distribution of the intermediate characteristic data when the set value of the control value stored in the storing module is switched;

a defective number estimating module which estimates a number of defectives based on a variation in the data distribution of the intermediate characteristic data estimated by the intermediate characteristic estimating module and an intermediate characteristic specification limit;

a switching amount deciding module which decides a switching amount for the set value of the control value so that the number of defectives estimated by the defective number estimating module is the minimum; and a control switching module which switches the set value of the control value of the control target device based on the switching amount decided by the switching amount deciding module.

Here, for the amount indicating the data distribution, various amounts can be used such as the mean value and the variation value.

According to the configuration, a variation in the data distribution of the intermediate characteristic data is estimated when the set value of the control value is switched, and the number of detectives to be generated is estimated. Then, the switching amount for the set value of the control value is decided so that the estimated number of defectives is the minimum, and the set value of the control value of the control target device is switched.

Therefore, since control over the control target device is switched so that the intermediate product is inspected in the middle of production to decrease the number of the defectives in the intermediate products, the intervals between control feedback loops can be reduced. Furthermore, since a variation in the data distribution is estimated to consider variations in data, the number of defectives to be generated can be more accurately estimated.

Moreover, desirably, the quality control apparatus further includes an impact storing module which stores an impact that indicates a degree of a variation in the data distribution of the intermediate characteristic data with respect to a change in a mean value of the control data, wherein the intermediate characteristic estimating module estimates the variation in the data distribution of the intermediate characteristic data based on the switching amount for the set value of the control value stored in the storing module and the impact stored in the impact storing module, and the switching amount deciding module decides a switching amount for the set value of the control value so that the number of defectives estimated by the defective number estimating module is the minimum. In this case, the correlation between a change in the mean value of the control data and a variation in the data distribution of the intermediate characteristic data is determined. Thus, the variation in the data distribution of the intermediate characteristic data can be more accurately estimated, and the number of defectives to be generated can be more accurately estimated.

Furthermore, desirably, the quality control apparatus further includes an impact creating module which creates the impact and stores it in the impact storing module when a difference more than a given amount is generated between the data distribution of the intermediate characteristic data corresponding to a switching amount for the set value of the control value decided by the switching amount deciding module and the distribution of the intermediate characteristic data collected by the storing module after the control switching module switches control. In this case, the impact can be automatically adjusted even though the variation is generated in the manufacturing process. Thus, a variation in the data distribution of the intermediate characteristic data can be more accurately estimated, and products of proper quality can be manufactured.

Moreover, desirably, the storing module further collects and stores final characteristic data of a completed product measured by a final characteristic measuring device, the quality control apparatus further includes:

a specification limit generating module which generates an intermediate characteristic specification limit set to the intermediate characteristic measuring device based on a data distribution of the final characteristic data stored in the storing module and a final characteristic specification limit set to the final characteristic measuring device, and the defective number estimating module uses the intermediate characteristic specification limit generated by the specification limit generating module. In this case, since the intermediate characteristic specification limit can be automatically corrected even though the variation is somewhat generated in the manufacturing process, the number of defectives to be generated can be more accurately estimated, and products of proper quality can be manufactured.

Besides, desirably, the storing module stores the control data and the intermediate characteristic data along with measured time or collected time, the quality control apparatus further includes:

an associating module which associates the control data with the intermediate characteristic data in consideration of dead time generated between the control target device and the intermediate characteristic measuring device at measured time or collected time. In this case, since the collected control data and the intermediate characteristic data are associated with the measured time or collected time, the associating module roughly associates the measured time or collected time by the dead time generated between the control target device and the intermediate characteristic measuring device, and thus the control data can be associated with the intermediate characteristic data.

In addition, desirably, the intermediate characteristic estimating module estimates a subsequent data distribution of the intermediate characteristic data by using the intermediate characteristic data collected by the storing module after a given time period has elapsed from when the control switching module switched control. In this case, since data in the middle of switching the control is not used, further accurate control is possible.

A control method of a quality control apparatus according to the invention is a control method of a quality control apparatus which controls a manufacturing process in order to manufacture products of predetermined quality, the apparatus including:

a storing module which collects measurement data measured by the multiple measuring devices disposed in a manufacturing process and stores the collected measurement data along with measured time or collected time, and the method including:

an association step of associating the measurement data of the measuring devices with each other in consideration of dead time generated between the measuring devices at measured time or collected time.

According to the method, since the collected measurement data is associated with the measured time or collected time, the associating module roughly associates the measured time or collected time by the dead time generated between the measuring devices, and thus the measurement data of the measuring devices can be associated with each other. Furthermore, the dead time is used only at the association step, and the data stored in the storing module is not influenced even though dead time is changed. Therefore, the dead time can be changed easily.

A control method of a quality control apparatus according to the invention is a control method of a quality control apparatus which controls a manufacturing process in order to manufacture products of predetermined quality, the apparatus including:

a storing module which collects and stores intermediate characteristic data of an intermediate product measured by an intermediate characteristic measuring device and final characteristic data of a completed product measured by a final characteristic measuring device, and the method including:

a specification limit generating step of generating an intermediate characteristic specification limit set to the intermediate characteristic measuring device based on a data distribution of the final characteristic data stored in the storing module and a final characteristic specification limit set in the final characteristic measuring device; and a specification limit setting control step of controlling the intermediate characteristic measuring device so as to set the specification limit generated at the specification limit generating step.

According to the method, since the intermediate characteristic specification limit is switched based on the final characteristic of the completed product at the specification limit generating step, the intermediate characteristic specification limit can be automatically adjusted even though various parameters are changed in the manufacturing process.

A control method of a quality control apparatus according to the invention is a control method of a quality control apparatus which controls a control target device disposed in a manufacturing process in order to manufacture products of predetermined quality, the apparatus including:

a storing module which collects and stores a set value of a control value set as a target value to the control target device, control data that is a measurement value of a control value measured by the control target device with respect to the set value of the control value, and intermediate characteristic data of an intermediate product measured by an intermediate characteristic measuring device, and the method including:

an intermediate characteristic estimating step of estimating a variation in a data distribution of the intermediate characteristic data when the set value of the control value stored in the storing module is switched;

a defective number estimating step of estimating a number of defectives based on the variation in the data distribution of the intermediate characteristic data estimated at the intermediate characteristic estimating step and an intermediate characteristic specification limit;

a switching amount deciding step of deciding a switching amount for the set value of the control value so that the number of defectives estimated at the defective number estimating step is the minimum; and a control switching step of switching the set value of the control value of the control target device based on the switching amount decided at the switching amount deciding step.

According to the method, the variation in the data distribution of the intermediate characteristic data is estimated when the set value of the control value is switched, and the number of defectives to be generated is estimated. Then, a switching amount for the set value of the control value is decided so that the estimated number of defectives is the minimum, and the set value of the control value of the control target device is switched. Therefore, since control over the control target device is switched so that the intermediate product is inspected in the middle of production to decrease the number of the defectives in the intermediate products, the intervals between control feedback loops can be reduced. Moreover, since the variation in the data distribution is estimated to also consider variations in data, the number of defectives to be generated can be more accurately estimated.

Besides, the individual modules in the quality control apparatus can be run on a computer by a quality control program. In addition, the quality control program is stored in a computer readable recording medium, and thus the quality control program can be executed on a given computer.

As described above, the quality control apparatus according to the invention exerts an advantage that since the collected measurement data is associated with the measured time or collected time, the associating module roughly associates the measured time or collected time by the dead time generated between the measuring devices and thus the measurement data of the measuring devices can be associated with each other.

BRIEF DESCRIPTION OF THE DRAWINGS

The teachings of the invention can be readily understood by considering the following detailed description in conjunction with the accompanying drawings, in which:

FIGS. 4A to 4D are diagrams illustrating examples of data stored in the data storing part in a table form, and show examples of first control data, second control data, intermediate characteristic data, and final characteristic data;

FIG. 11 is a diagram illustrating an example of an estimated value table for intermediate characteristics created by an intermediate characteristic estimating part of the estimating part in a table form;

FIG. 12 is a diagram illustrating an example of a passed/failed list for intermediate characteristics created by a defective estimating part in the estimating part in a table form;

FIG. 13 is a diagram illustrating an example of a total defective number table created by an estimated value evaluating part in the estimating part in a table form;

FIG. 14 is a diagram illustrating types of improper acquired data generated in general production sites, and the correlation between the exemplary cause and the description in a table form; and FIG. 15 is a diagram illustrating types of improper acquired data, and the correlation between information and reasons showing whether acquired data is invalid or valid when associated with a set of a previous process step or subsequent process step in a table form.

DESCRIPTION OF THE PREFERRED EMBODIMENT

Figure 1:
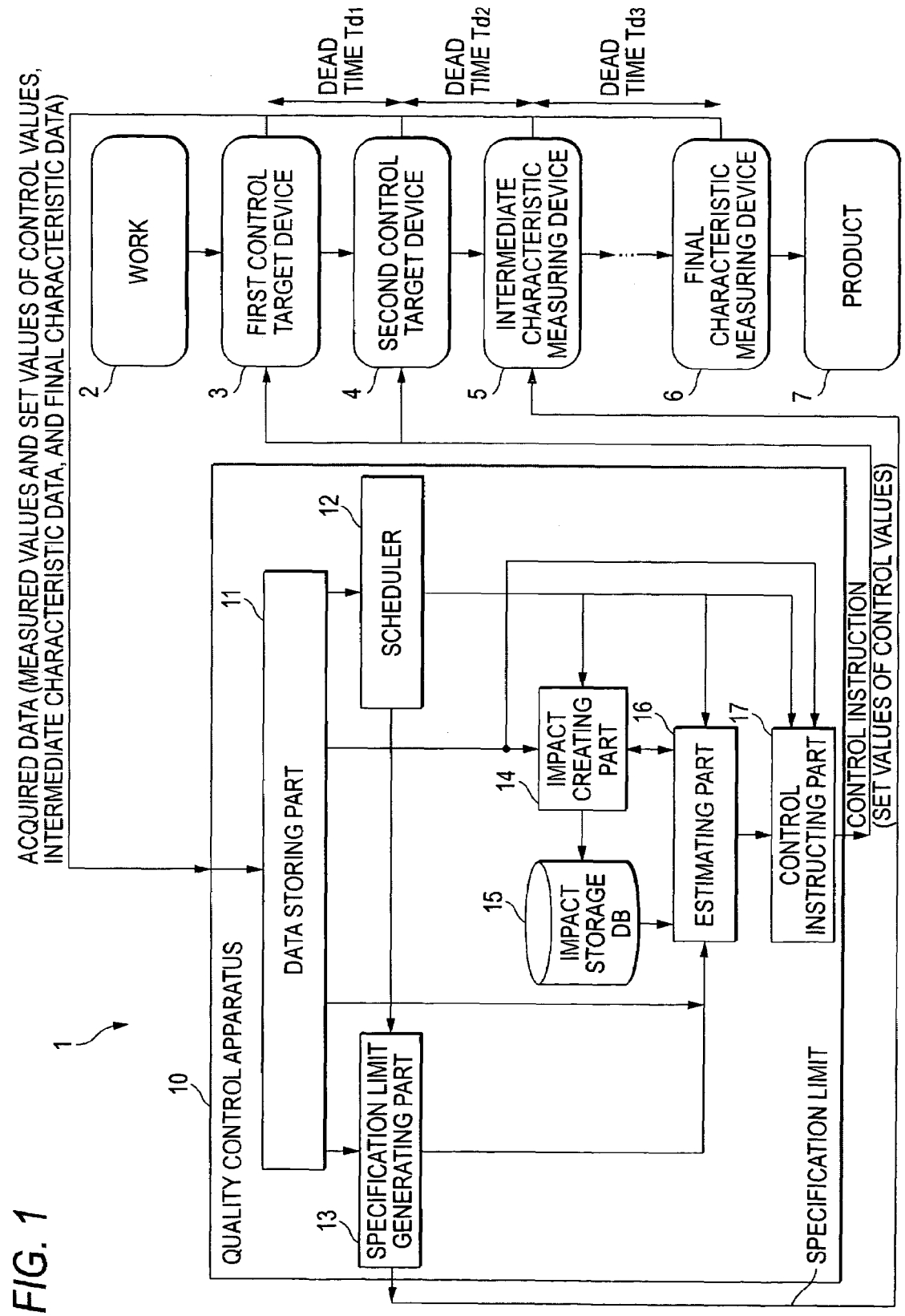
FIG. 1 is a block diagram illustrating the schematic configuration of a quality control system including a quality control apparatus of an embodiment according to the invention.

Hereinafter, an embodiment according to the invention will be described based on FIGS. 1 to 15. FIG. 1 shows the schematic configuration of a quality control system which controls quality of products manufactured of certain materials. As shown in the drawing, a quality control system 1 is configured to have control target devices (measuring devices) 3 and 4 to be control targets, an intermediate characteristic measuring device (measuring device) 5 which inspects the intermediate characteristics to be the characteristics of intermediate products in the middle of production, a final characteristic measuring device (measuring device) 6 which inspects the final characteristics of manufactured products, and a quality control apparatus 10 which collects data from the various devices 3 to 6 to control the control target devices 3 and 4 based on the collected data, and switches specification limits in the intermediate characteristic measuring device 5.

Generally, a work 2 undergoes various process steps to manufacture a product 7. In the embodiment, in order to facilitate understanding the invention, the work is considered to be manufactured as follows. More specifically, the first and second control target devices 3 and 4 sequentially perform their processes to the work 2. After that, the intermediate characteristic measuring device 5 performs an inspection process for the intermediate characteristics, and the other devices perform various processes. Then, the final characteristic measuring device 6 performs an inspection process for final characteristics.

Each of the control target devices 3 and 4 acquires the set values for the control values from the quality control apparatus 10, and operates based on the acquired set values. Furthermore, each of the control target devices 3 and 4 actually measures the control values, and sends the measurement values measured to the quality control apparatus 10. Here, when a control target device is a heater, for example, the control values are numeric values showing temperatures such as temperatures, voltages and resistances corresponding to the temperatures.

The intermediate characteristic measuring device 5 acquires the specification limits from the quality control apparatus 10, and inspects the intermediate characteristics of the work 2 (intermediate product) based on the acquired specification limits. Moreover, the intermediate characteristic measuring device 5 sends the inspected intermediate characteristics to the quality control apparatus 10.

An intermediate product determined as being out-of-specification by the intermediate characteristic measuring device 5 is generally removed right after its intermediate characteristics are inspected. However, when an intermediate product determined as out-of-specification is likely to be easily turned to be acceptable by again being processed by the second control target device 4, that intermediate product can be put back to the process steps done by the second control target device 4. Moreover, when the intermediate product is difficult to be removed right after its intermediate characteristics are inspected because of the system configuration and the device structure, it is fine to remove the intermediate product at the subsequent process steps.

The final characteristic measuring device 6 inspects the final characteristics of the completed product based on the predetermined specification limits. At this time, the completed product determined as out-of-specification is discarded, repaired, or disassembled and reused, whereas the completed product determined as acceptable is shipped as a product 7. Besides, the final characteristic measuring device 6 sends the inspected final characteristics to the quality control apparatus 10.

In addition, a time lag is generated at the time when the individual devices 3 to 6 process a certain work 2. This time lag is called 'dead time'. In the case shown in FIG. 1, dead time Td1 is generated between the time when the first control target device 3 starts its process and the time when the second control target device 4 starts its process. Dead time Td2 is generated between the time when the second control target device 4 starts its process and the time when the intermediate characteristic measuring device 5 starts its process. Dead time Td3 is generated between the time when the intermediate characteristic measuring device 5 starts its process and the time when the final characteristic measuring device 6 starts its process.

Furthermore, a single or multiple of the control target devices, the intermediate characteristic measuring devices, and the final characteristic measuring devices are acceptable. Moreover, all the devices relating to production are not necessarily the control target devices. Besides, it is possible that a single device includes multiple control target devices.

As shown in FIG. 1, the quality control apparatus 10 is configured to have a data storing part (storing module) 11, a scheduler (associating module) 12, a specification limit generating part (a specification limit generating module and a specification limit setting control module) 13, an impact creating part (impact creating module) 14, an impact storage DB (data base) (impact storing module) 15, an estimating part 16, and a control instructing part (control switching module) 17. The control apparatus 10 is configured of a PC (Personal Computer) based computer, for example.

The data storing part 11 sequentially acquires the measurement values of the control values from each of the control target devices 3 and 4, stores the acquired measurement values and acquired time (collected time) as control data, sequentially acquires the intermediate characteristic data from the intermediate characteristic measuring device 5, stores the acquired intermediate characteristic data and acquired time as intermediate characteristic data, sequentially acquires the final characteristic data from the final characteristic measuring device 6, and stores the acquired final characteristic data and acquired time as final characteristic data. In addition, the data storing part 11 notifies the scheduler 12 that the data storing part 11 starts acquiring data. Furthermore, it is fine that the individual devices 3 to 6 store measured time instead of the acquired time.

The scheduler 12 associates data that is considered to belong to the same work 2 with each other among the control data, the intermediate characteristic data, and the final characteristic data stored in the data storing part 11 by using the acquired time and the dead time for each item of data. Moreover, the scheduler 12 decides the timing to switch the set values of the control values for controlling the control target devices 3 and 4, and the timing to switch the specification limits of the intermediate characteristics of the intermediate characteristic measuring device 5.

Besides, it is fine that the association is conducted based on the individual works 2, or a given number of the works 2, or the works 2 processed during a given time period. Hereinafter, a series of items of data included in the given number or given time period is called a set.

The specification limit generating part 13 reads a set of the intermediate characteristic data and a set of the final characteristic data associated by the scheduler 12 out of the data storing part 11, and generates the specification limits of the intermediate characteristics based on the read out sets. Furthermore, the specification limit generating part 13 sends the generated specification limits to the intermediate characteristic measuring device 5 based on the timing decided by the scheduler 12. Moreover, it is fine that the specification limit generating part 13 generates the specification limits only when the specification limits of the intermediate characteristics of the intermediate characteristic measuring device 5 need to be switched. Besides, the specification limit generating part 13 generates the estimated values of the specification limits of the intermediate characteristics, and sends the generated estimated values to the estimating part 16.

The impact creating part 14 creates an impact in accordance with the request of the estimating part 16. Here, an impact shows how the intermediate characteristics are varied when the control values are switched. Furthermore, the impact creating part 14 sends the created impact to the estimating part 16 as well as stores it in the impact storage DB 15. More specifically, the impact creating part 14 reads a set of the control data and a set of the intermediate characteristic data associated by the scheduler 12 out of the data storing part 11, and calculates a variation in the mean value and/or variance of the intermediate characteristic data with respect to a change in the mean value of the control data based on the read sets for normalization to create an impact. Moreover, instead of variance, given indicators showing the extent of variations can be used. For example, standard deviation and half width can be used.

The estimating part 16 reads a set of the intermediate characteristic data associated by the scheduler 12 out of the data storing part 11, and estimates the mean value of the intermediate characteristics and/or the variation in variance from the read set by using the impact read out of the impact storage DB 15. Besides, the estimating part 16 estimates the number of defectives when the distribution of the intermediate characteristics is changed by the estimated value of the variation, and evaluates by the sum of each of the number of defectives. Then, it determines the switching amount for the set value of the control value when the number of defectives is the minimum, and sends it to the control instructing part 17.

The control instructing part 17 switches the set value of the control value based on the switching amount for the set value of the control value determined by the estimating part 16. Furthermore, the control instructing part 17 sends the switched set value as a control instruction to the control target devices 3 and 4 based on the timing decided by the scheduler 12. Therefore, the set value of the control value is switched in the control target devices 3 and 4.

Figure 2:
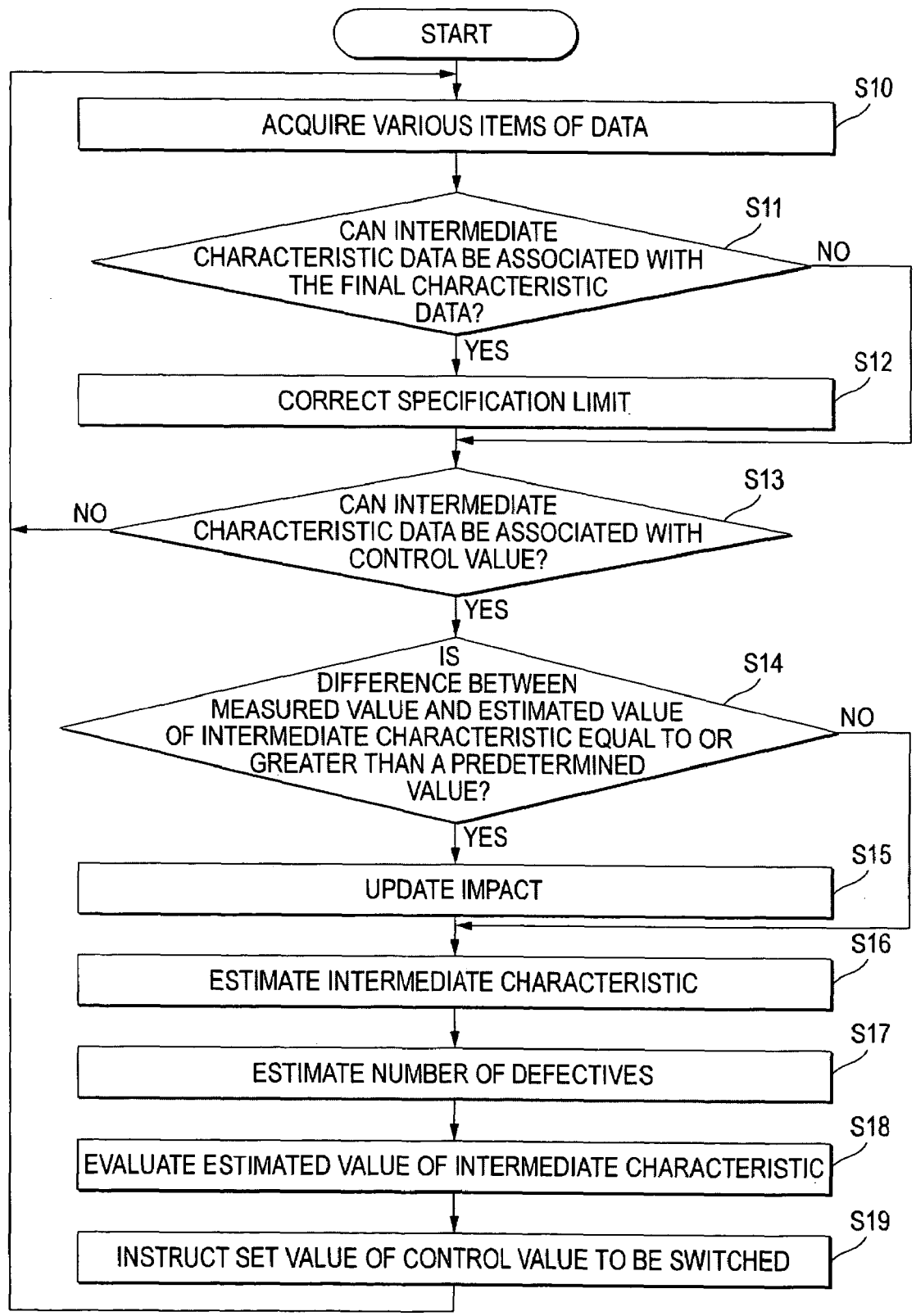
FIG. 2 is a flow chart illustrating the process operation of the quality control apparatus.

The process operation in the quality control system 1 of the configuration will be described based on FIG. 2. FIG. 2 shows the outline of the process operation in the quality control system 1. In addition, not shown in the drawing, when the quality control apparatus 10 starts its operation, it sequentially acquires various items of data from the individual devices 3 to 6 to keep storing data.

First, the scheduler 12 acquires various items of data from the data storing part 11 (Step S10) (hereinafter, it is sometimes simply denoted as 'S10'. It is the same as the other steps), and determines whether the intermediate characteristic data can be associated with the final characteristic data (S1).

When the association is possible (YES at S11), the specification limit generating part 13 uses a set of the intermediate characteristic data and a set of the final characteristic data both being associated to generate, sends the specification limits of the intermediate characteristics to the intermediate characteristic measuring device 5, and then corrects the specification limits of the intermediate characteristic (S12). On the other hand, when the association is impossible (NO at S11), the specification limits of the intermediate characteristics are not corrected and proceed to the subsequent step (S13).

Subsequently, the scheduler 12 determines whether the control data can be associated with the intermediate characteristic data (S13). When the association is impossible (NO at S13), return to Step S10 to repeat the process operation.

On the other hand, when the association is possible (YES at S13), it determines whether the difference between the measurement value of the intermediate characteristic data and the estimated value of the intermediate characteristic data previously estimated is equal to or greater than a predetermined value (S14). When the difference between the measurement value and the estimated value is equal to or greater than the predetermined value (YES at S14), the impact creating part 14 creates an impact and updates the impact stored in the impact storage DB 15 (S15). On the other hand, when the difference between the measurement value and the estimated value is below the predetermined value (NO at S14), the impact is not updated and proceed to the subsequent step (S16).

Then, the estimating part 16 extracts a set of the intermediate characteristic data from the data storing part 11 as well as acquires an impact from the impact storage DB 15, uses the extracted set of the intermediate characteristic data and the acquired impact, estimates how the data distribution of the intermediate characteristic data is varied when the set values of the control values are switched (S16), and estimates the number of defectives (S17).

Subsequently, the estimating part 16 decides the estimated value of the intermediate characteristic data (a variation in the distribution) so that the number of defectives is the minimum (S18), and decides a switched amount for the corresponding set value of the control value. Then, the control instructing part 17 decides the set value of the control value based on the decided variation, sends the decided set value of the control value to the control target devices 3 and 4, and thus instructs the control value to be switched (S19). After that, return to Step S10, and repeat the process operation above.

According to the configuration, since the data stored in the data storing part 11 is associated with the measured time or collected time, the scheduler 12 roughly associates the measured time or collected time by dead time generated between the measuring devices, and thus the measurement data of the measuring devices can be associated between the measuring devices. Furthermore, the dead time is used only by the scheduler 12, and the data stored in the data storing part 11 is not affected even though the dead time is changed. Therefore, the dead time can be changed easily.

Moreover, since the specification limit generating part 13 switches the specification limit of the intermediate characteristic based on the final characteristics of the completed product, the specification limit of the intermediate characteristic can be automatically adjusted even though various parameters are changed in the manufacturing processes.

Besides, the estimating part 16 estimates the variation in the data distribution of the intermediate characteristic data when the set value of the control value is switched, estimates the number of defectives to be generated, decides the switching amount for the set value of the control value so that the estimated number of defectives is the minimum, and switches the set value of the control value for the control target device. Thus, the intermediate product is inspected in the middle of production, and control over the control target device is switched so that the number of the defectives in the intermediate products is decreased. Therefore, the intervals between control feedback loops can be reduced. Moreover, since the variation in the data distribution is estimated to also consider variations in data, the number of defectives to be generated can be more accurately estimated.

Besides, since the impact stored in the impact storage DB 15 reveals the correlation between a change in the mean value of the control data and a variation in the data distribution of the intermediate characteristic data, a variation in the data distribution of the intermediate characteristic data can be more accurately estimated, and the number of defectives to be generated can be more accurately estimated.

Furthermore, since the impact creating part 14 creates and stores an impact in the impact storage DB 15 when the estimated value of the intermediate characteristic is deviated from the actual measured value, an impact can be automatically corrected even though the variation is generated somewhat in the manufacturing processes. Accordingly, a variation in the data distribution of the intermediate characteristic data can be more accurately estimated, and products of proper quality can be manufactured.

Moreover, the quality control apparatus 10 can be applied to various processes. As one example of the applicable process, a manufacturing process for a sensor device described in JP-A-2002-287803 is named. This manufacturing process is formed of a molding and grinding process step (process step 1), a firing process step (process step 2), a plating process step (process step 3), a deposition process step of an electrode protective layer (process step 4), a deposition process step of a trap layer (process step 5), an aging process step (process step 6), an assembly process step (process step 7), and a characteristic inspection process step (process step 8). From the process steps 1 to 6, the molding gravity, firing gravity, plating film thickness, coat film thickness, coating weight, and aging temperature and additive concentration are acquired as intermediate characteristics, and the final characteristics at the process step 8. Moreover, the devices used in each of the process steps are the control target devices.

Hereinafter, each block in the quality control apparatus 10 will be described in detail based on FIGS. 3 to 15.

Figure 3:
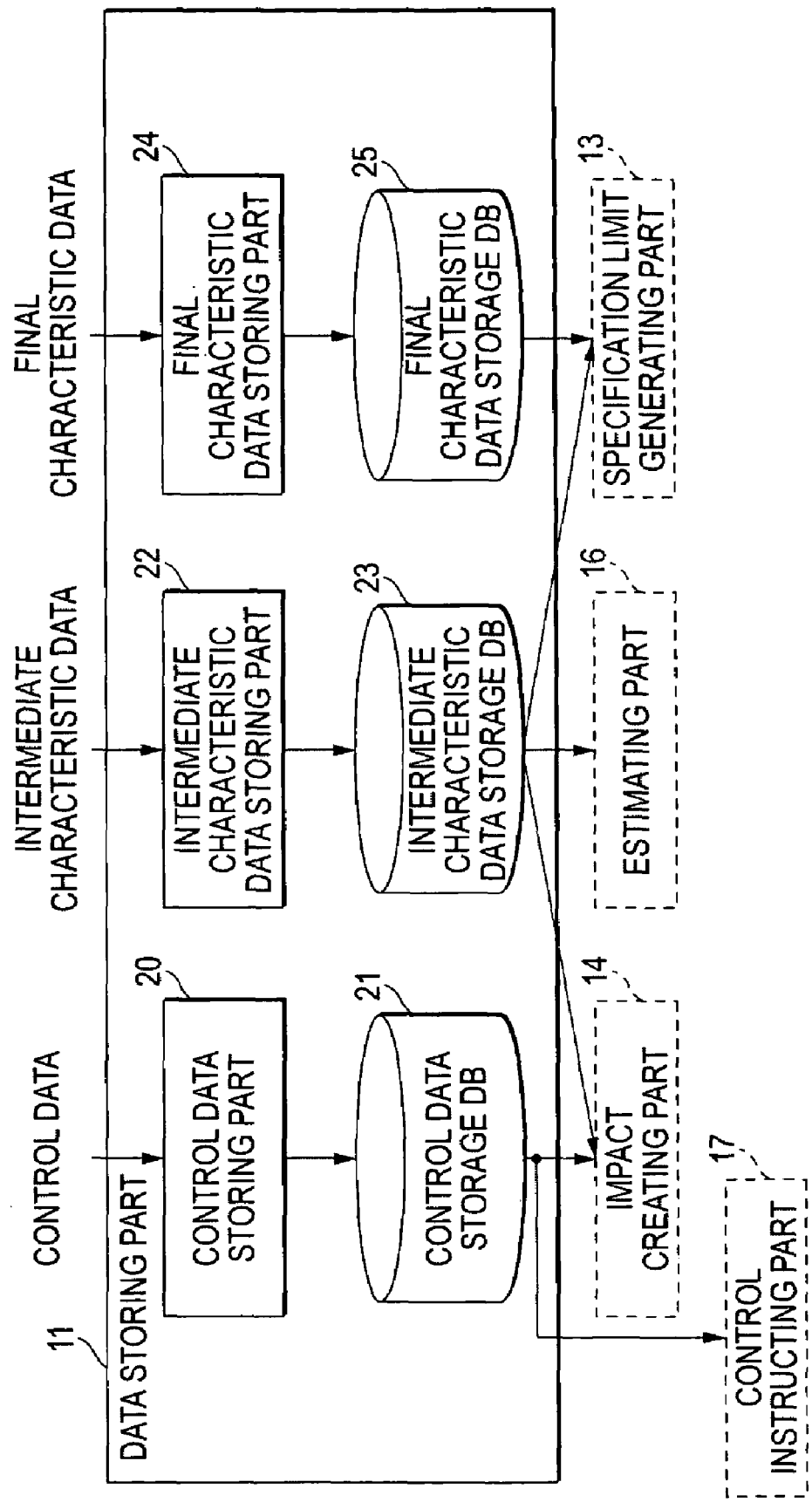
FIG. 3 is a functional block diagram illustrating the schematic configuration of a data storing part in the quality control apparatus.

FIG. 3 shows the schematic configuration of the data storing part 11. The data storing part 11 is configured to have a control data storing part 20 and a control data storage DB 21, an intermediate characteristic data storing part 22 and an intermediate characteristic data storage DB 23, and a final characteristic data storing part 24 and a final characteristic data storage DB 25.

The control data storing part 20 acquires as control data a set value of the control value that the control instructing part 17 instructs a control target device, the measurement value actually measured by the control target device with respect to the set value, and acquired time at which the measurement value is acquired, and stores the acquired control data in the control data storage DB 21. Furthermore, the control data is acquired and stored in each of the control target devices 3 and 4. Moreover, it is fine that the set value of the control value is acquired from the control target devices 3 and 4 or from the control instructing part 17.

The intermediate characteristic data storing part 22 acquires two intermediate characteristics A and B inspected by the intermediate characteristic measuring device 5, and associates the acquired intermediate characteristics A and B with the acquired time to store them in the intermediate characteristic data storage DB 23. Besides, the final characteristic data storing part 24 acquires two final characteristics A and B inspected by the final characteristic measuring device 6, associates the acquired final characteristics A and B with the acquired time, and stores them in the final characteristic data storage DB 25.

FIGS. 4A and 4B show examples of control data stored in the control data storage DB 21 with respect to the control target devices 3 and 4. In addition, FIGS. 4C and 4D show examples of data for the intermediate characteristics stored in the intermediate characteristic data storage DB 23 and the final characteristic data storage DB 25.

Furthermore, production numbers shown in FIGS. 4A to 4D are serial numbers for the works 2 processed by the individual devices. As described above, since the works 2 are sometimes gathered, omitted, or put back in the middle of production, even the same production numbers in the individual devices do not always correspond to the same works 2. For example, the work 2 corresponding to production number 1 of the first control target does not always correspond to production number 1 of the second control target.

Moreover, the intermediate characteristics inspected by the intermediate characteristic measuring device 5 are the characteristics of the intermediate product in the middle of production, which are inspected before inspected by the final characteristic measuring device 6. Therefore, the intermediate characteristics do not always have the same values as those of the final characteristics. Besides, two types of intermediate characteristics and final characteristics are acquired in the embodiment, but one or three types or more are acceptable.

Next, the detail of the scheduler 12 will be described based on FIGS. 5 and 6. As described above, the scheduler 12 associates various items of data with each other stored in the data storing part 11, decides the timing to extract the associated data, and decides the timing to switch the set values of the control values to control the control target devices 3 and 4 and to switch the specification limits of the intermediate characteristics in the intermediate characteristic measuring device 5. Furthermore, the scheduler 12 sends the decided timing to the specification limit generating part 13 and the control instructing part 17.

Figure 5:
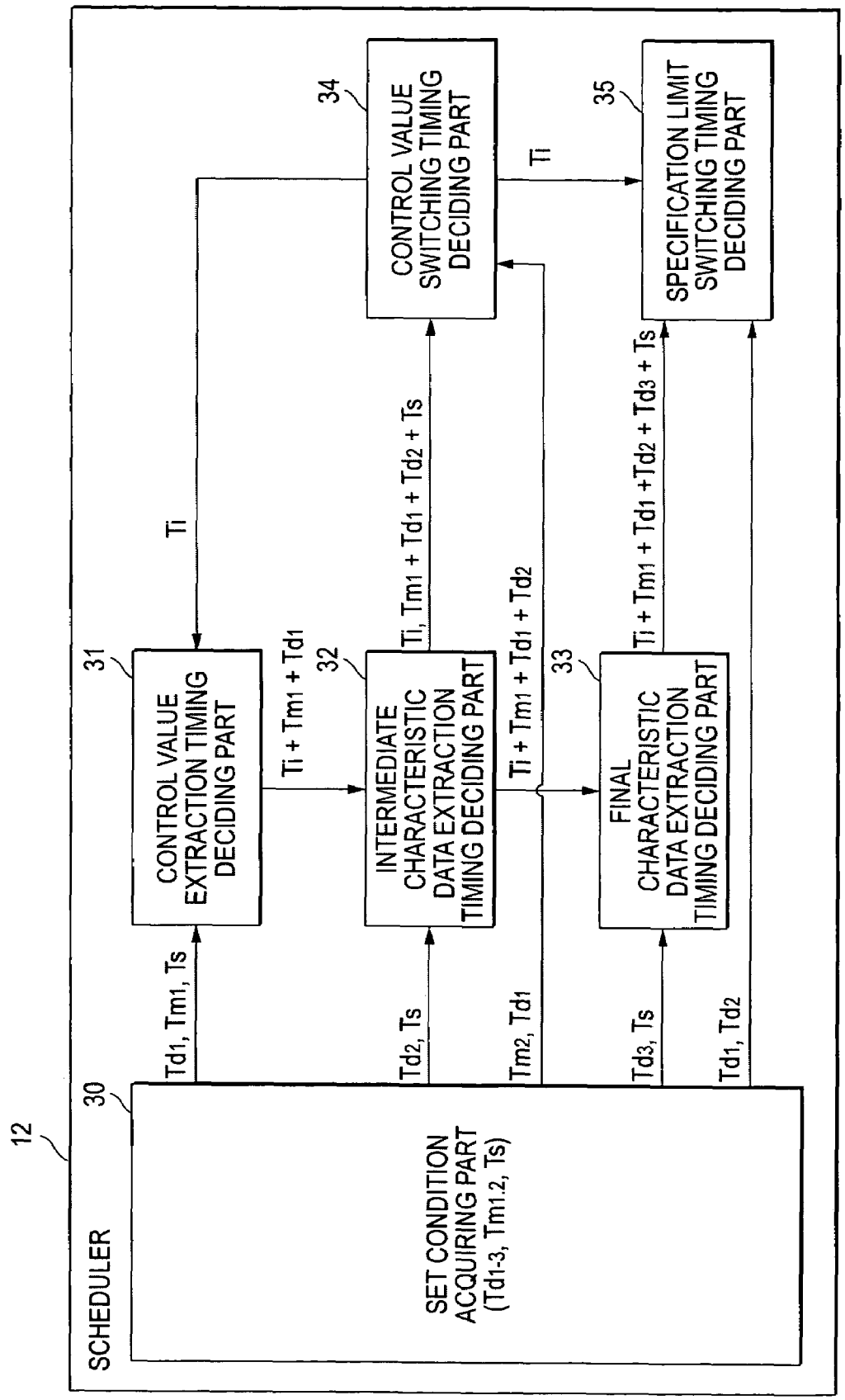
FIG. 5 is a functional block diagram illustrating the schematic configuration of a scheduler in the quality control apparatus.

FIG. 5 shows the schematic configuration of the scheduler 12. As shown in the drawing, the scheduler 12 is configured to have a setting part 30, a control value extraction timing deciding part 31, an intermediate characteristic data extraction timing deciding part 32, a final characteristic data extraction timing deciding part 33, a control value switching timing deciding part 34, and a specification limit switching timing deciding part 35.

The setting part 30 sets dead times Td1 to Td3 generated between the devices to acquire data, margin times Tm1 and Tm2, and time period Ts for the associated set, and sends them to the individual parts 31 to 35. Furthermore, it is fine that these values are acquired from a user through an input device such as a keyboard, or from a storage device, or from the other devices through a communication device.

Here, the first margin time Tm1 is a time period from the time to instruct switching the set values of the control values and the specification limits of the intermediate characteristics to the first acquired time of extraction from various items of data. The first margin time Tm1 is set so as to remove a time lag from the time to instruct switching the set value and the specification limit with respect to a device to the time to actually do the instruction with respect to the work 2, or remove a shift due to drawing a defective or to putting back a work.

Moreover, the second margin time Tm2 is a time period from the last acquired time of extraction from the intermediate characteristic data to the time to instruct switching the set value of the control value with respect to the first control target device 3. The second margin time Tm2 is set so as to consider processing time required to determine the set value to be switched.

Besides, it is fine that the margin times Tm1 and Tm2 and the time period Ts for a set are expressed by the number of the works 2. When the time period Ts for a set is expressed by the number of the works 2, the number of items of data included in each of the associated sets is constant, and thus the accuracy of statistics for each set can be nearly matched. Therefore, as in the case where any one of the devices 3 to 6 is once stopped and then again started, for example, the individual sets can be properly associated with each other even though the dead time is varied.

In addition, as for a method to derive the values for the dead times Td1 to Td3 and the margin times Tm1 and Tm2, the following three methods are named. More specifically, first, a method to derive the values by calculation from the design value of the quality control system, that is, the time required for processing in each device, and the design value of the distance traveled and the rate of travel in moving works between the individual devices. Secondly, a method to derive the values by conducting test working to measure processing time and traveling time of works for actual measured values. Thirdly, a method to derive the values by conducting actual production working to measure processing time and traveling time of works for actual measured values.

In practice, it is desirable to combine these methods properly for derivation. For example, a method is named in which the initial set value before the quality control system is operated is derived from the first method and fine adjustments are done by the second or third method after operated.

Furthermore, the intermediate characteristics inspected by the intermediate characteristic measuring device 5 are the characteristics of the intermediate product in the middle of production, which are inspected before inspected by the final characteristic measuring device 6. Therefore, the intermediate characteristics are not always the same values as those of the final characteristics. Moreover, two types of intermediate characteristics and final characteristics are acquired in the embodiment, but one or three types or more are acceptable.

Next, the detail of the scheduler 12 will be described based on FIGS. 5 and 6. As described above, the scheduler 12 associates various items of data stored in the data storing part 11 with each other, decides the timing to extract the associated data, and decides the timing to switch the set values of the control values for controlling the control target devices 3 and 4 and to switch the specification limits of the intermediate characteristics in the intermediate characteristic measuring device 5. Furthermore, the scheduler 12 sends the decided timing to individual blocks 13, 14, 16 and 17.

FIG. 5 shows the schematic configuration of the scheduler 12. As shown in the drawing, the scheduler 12 is configured to have the setting part 30, the control value extraction timing deciding part 31, the intermediate characteristic extraction timing deciding part 32, the final characteristic extraction timing deciding part 33, the control value switching timing deciding part 34, and the specification limit switching timing deciding part 35.

The setting part 30 sets the dead times Td1 to Td3 generated between the devices to acquire data, the margin times Tm1 and Tm2, and the time period Ts for the associated sets, and sends them to the individual parts 31 to 35. Moreover, it is fine that these values are acquired from a user through an input device such as a keyboard, or from a storage device, or from the other devices through a communication device. Besides, it is acceptable to express the margin times Tm1 and Tm2 and the time period Ts for the sets by the number of intermediate products.

Here, the first margin time Tm1 is a time period from the time to instruct switching the set value of the control value and the specification limit of the intermediate characteristic to the first acquired time of extraction from various items of data. The first margin time Tm1 is set so as to remove a time lag from the time to instruct switching the set value and the specification limit with respect to a device to the time to actually do the instruction with respect to the work 2, or remove a shift due to drawing a defective or to putting back a work.

In addition, the second margin time Tm2 is a time period from the last acquired time of extraction from the intermediate characteristic data to the time to instruct switching the set value of the control value with respect to the first control target device 3. The second margin time Tm2 is set so as to consider processing time required to determine the set value to be switched.

Furthermore, as for a method to derive the values for the dead times Td1 to Td3 and the margin times Tm1 and Tm2, the following three methods are named. More specifically, first, a method to derive the values by calculation from the design value of the quality control system, that is, the time required for processing in each device, and the design value of the distance traveled and the rate of travel in moving works between the individual devices. Secondly, a method to derive the values by conducting test working to measure processing time and traveling time of works for actual measured values. Thirdly, a method to derive the values by conducting actual production working to measure processing time and traveling time of works for actual measured values.

In practice, it is desirable to combine these methods properly for derivation. For example, a method is named in which the initial set value before the quality control system is operated is derived from the first method and fine adjustments are done by the second or third method after operated.

The control value extraction timing deciding part 31 decides the control value extraction timing that is the timing to extract the measurement value of the control value from each item of the control data. First, it acquires the first dead time Td1, the first margin time Tm1, and the time period Ts for a set from the setting part 30, and acquires operation start time T0 that starts the operation of the scheduler 12 and switching instruction time Ti (i is an integer equal to or greater than 1) that instructs switching the set value of the control value from the control value switching timing deciding part 34. Moreover, hereinafter, the operation start time and the switching instruction time are combined to Ti (i is an integer equal to or greater than 0).

Subsequently, the control value extraction timing deciding part 31 decides the time from the time Ti+Tm1 that the first margin time Tm1 is added to the operation start time or the switching instruction time Ti to the time period Ts for a set as a first control value extraction timing. Then, it decides the time from the time Ti+Tm1+Td1 that the first dead time Td1 is added to the start time Ti+Tm1 for the first control value extraction timing to the time period Ts for a set as a second control value extraction timing. Besides, the control value extraction timing deciding part 31 sends the start time Ti+Tm1+Td1 for the second control value extraction timing to the intermediate characteristic extraction timing deciding part 32.

The intermediate characteristic extraction timing deciding part 32 decides the intermediate characteristic extraction timing that is the timing to extract the intermediate characteristics from the intermediate characteristic data. First, it acquires the second dead time Td2 and the time period Ts for a set from the setting part 30, and acquires the start time Ti+Tm1+Td1 for the second control value extraction timing from the control value extraction timing deciding part 31.

Subsequently, the intermediate characteristic extraction timing deciding part 32 decides the time from the time Ti+Tm1+Td1+Td2 that the second dead time Td2 is added to the start time Ti+Tm1+Td1 for the second control value extraction timing to the time period Ts for a set as the intermediate characteristic extraction timing. Furthermore, the intermediate characteristic extraction timing deciding part 32 sends the start time Ti+Tm1+Td1+Td2 for the intermediate characteristic extraction timing to the final characteristic extraction timing deciding part 33 as well as sends termination time Ti+Tm1+Td1+Td2+Ts for the intermediate characteristic extraction timing to the control value switching timing deciding part 34.

The final characteristic extraction timing deciding part 33 decides the final characteristic extraction timing that is the timing to extract the final characteristics from the final characteristic data. First, it acquires the third dead time Td3 and the time period Ts for a set from the setting part 30, and acquires the start time Ti+Tm1+Td1+Td2 for the intermediate characteristic extraction timing from the intermediate characteristic extraction timing deciding part 32.

Subsequently, the final characteristic extraction timing deciding part 33 decides the time from the time Ti+Tm1+Td1+Td2+Td3 that the third dead time Td3 is added to the start time Ti+Tm1+Td1+Td2 for the intermediate characteristic extraction timing to the time period Ts for a set as the final characteristic extraction timing. Moreover, the final characteristic extraction timing deciding part 33 sends the termination time Ti+Tm1+Td1+Td2+Td3+Ts for the final characteristic extraction timing to the specification limit switching timing deciding part 35.

The control value switching timing deciding part 34 decides first and second control value switching timings that are the timing to switch the set values of the control values in the first and second control target devices 3 and 4. First, it acquires the first dead time Td1 and the second margin time Tm2 from the setting part 30, and acquires the termination time Ti+Tm1+Td 1+Td2+Ts for the intermediate characteristic extraction timing from the intermediate characteristic extraction timing deciding part 32.

Subsequently, the control value switching timing deciding part 34 decides the time Ti+Tm1+Td1+Td2+Ts+Tm2 that the second margin time Tm2 is added to the termination time Ti+Tm1+Td1+Td2+Ts for the intermediate characteristic extraction timing as the first control value switching timing, and decides the time Ti+Tm1+2×Td1+Td2+Ts+Tm2 that the first dead time Td1 is added to the first control value switching timing Ti+Tm1+Td1+Td2+Ts+Tm2 as the second control value switching timing. Furthermore, the control value switching timing deciding part 34 sends the first control value switching timing Ti+Tm1+Td1+Td2+Ts+Tm2 as the switching instruction time Ti next time to the control value extraction timing deciding part 31 and the specification limit switching timing deciding part 35.

The specification limit switching timing deciding part 35 decides the specification limit switching timing that is the timing to switch the specification limit of the intermediate characteristic in the intermediate characteristic measuring device 5. First, it acquires the first and second dead times Td1 and Td2 from the setting part 30, and acquires the termination time Ti+Tm1+Td1+Td2+Td3+Ts for the final characteristic extraction timing from the final characteristic extraction timing deciding part 33, and acquires the switching instruction time Ti from the control value switching timing deciding part 34.

Subsequently, the specification limit switching timing deciding part 35 specifies the switching instruction time Ti that appears first after the termination time Ti+Tm1+Td1+Td2+Td3+Ts for the final characteristic extraction timing, and decides the time Ti+Td1+Td2 that the specified switching instruction time Ti is added to the first and second dead times Td1 and Td2 as the specification limit switching timing.

Figure 6:
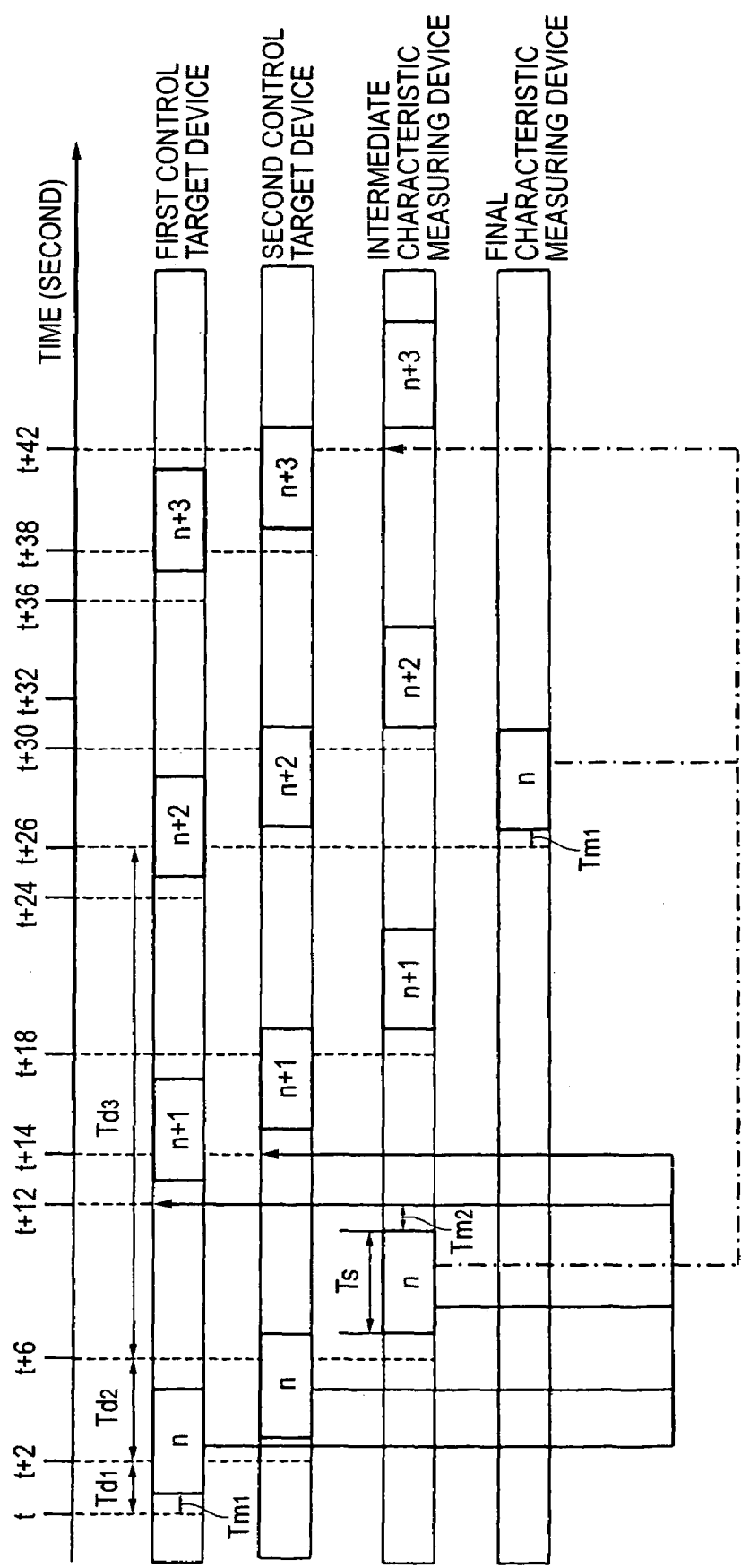
FIG. 6 is a timing chart illustrating the exemplary timing operation of the scheduler.

FIG. 6 shows the exemplary timing operation of the scheduler 12 of the configuration. In the drawing, areas denoted by n to (n+3) are sets associated between the individual devices 3 to 6. In addition, in the example shown in the drawing, the first dead time Td1 is two seconds, the second dead time Td2 is four seconds, and the third dead time Td3 is 20 seconds. Furthermore, the first and second margin times Tm1 and Tm2 are 0.75 second, and the time period Ts for a set is 4.5 seconds After the scheduler 12 starts its operation, the control value switching timing deciding part 34 decides switching instruction time Tn (=t) relating to the nth set. Then, the control value extraction timing deciding part 31 decides the time from the time Tn+Tm1 (=t+0.75) to the time period Ts for a set (=4.5) as the first control value extraction timing, and decides the time from the time Tn+Tm1+Td1 (=t+2+0.75) to the time period Ts for a set as the second control value extraction timing.

Subsequently, the intermediate characteristic extraction timing deciding part 32 decides the time from time Tn+Tm1+Td1+Td2 (=t+6+0.75) to the time period Ts for a set as the intermediate characteristic extraction timing. The control data can be extracted by the intermediate characteristic extraction timing, and the intermediate characteristic data can be extracted at the intermediate characteristic extraction timing. Thus, as described above, the set values of the control values for the control target devices 3 and 4 are determined based on the extracted control data and the intermediate characteristic data, and control instructions to switch to the determined set values are sent to the control target devices 3 and 4.

The control value switching timing deciding part 34 decides the sending timing to send. More specifically, the control value switching timing deciding part 34 decides the time Tn+Tm1+Td1+Td2+Ts+Tm2 (=t+12) as the first control value switching timing, and decides the time Tn+Tm1+2×Td1+Td2+Ts+Tm2 (=t+14) as the second control value switching timing. Moreover, the control value switching timing deciding part 34 turns the time Tn+Tm1+Td1+Td2+Ts+Tm2 (=t+12) that is the first control value switching timing to a switching instruction item Tn+1 (=t+12) relating to the (n+1)-th set. Hereinafter, it repeats the extraction of the control data and the intermediate characteristic data and the switching of the set values of the control values.

On the other hand, the final characteristic extraction timing deciding part 33 decides the time from the time Ti+Tm1+Td1+Td2+Td3 (=t+26+0.75) to the time period Ts for a set as the final characteristic extraction timing. The intermediate characteristic data can be extracted by the final characteristic extraction timing, and the final characteristic data can be extracted at the final characteristic extraction timing. Therefore, as described above, the specification limits of the intermediate characteristics are determined based on the extracted intermediate characteristic data and final characteristic data, and a control instruction to switch to the determined specification limits are sent to the intermediate characteristic measuring device 5.

The specification limit switching timing deciding part 35 decides the timing to send. More specifically, the control value switching timing deciding part 35 specifies the switching instruction time Ti (=t+36) that appears first after the termination time Ti+Tm1+Td1+Td2+Td3+Ts (=t+26+0.75+4.5) for the final characteristic extraction timing, and decides the time Ti+Td1+Td2 (=t+42) as the specification limit switching timing. Hereinafter, the extraction of the intermediate characteristic data and the final characteristic data and the switching of the specification limits are repeated.

Furthermore, there is sometimes improperly associated data in the acquired data. FIG. 14 shows the types of the improper acquired data generated in general production sites, and the cause and contents. As shown in the drawing, as the types of the improper acquired data, 'outlier', 'remeasurement', 'putting back', and 'removed product' are named.

The 'outlier' shows the case where the measurement value is greatly deviated from the normal value. Generally, in order to calculate statistics from many items of data to estimate the data distribution, desirably, the data distribution is formed nearly in the normal distribution that data gathers close to the mean value. Therefore, when the outlier is included in a set as the acquired data, it is difficult to properly estimate the data distribution of the set because the outlier greatly influences it.

The 'remeasurement' shows the case where a device fails to measure, for example, and thus again measures the same work 2. In this case, multiple measurement values exist for the same work 2, and the measurement value before remeasurement is highly likely to be abnormal. Therefore, when the measurement value before remeasurement is included as the acquired data in a set, it is difficult to properly estimate the data distribution of the set as similar to the case of the outlier.

The 'putting back' shows the case where the work 2 determined as out-of-specification by the intermediate characteristic measuring device 5, for example, is put back to the process steps done by the second control target device 4. In this case, relating to the work 2 having been put back, there are the acquired data of the second control target device 4 and the acquired data of the intermediate characteristic measuring device 5 and the final characteristic measuring device 6 in the subsequent process steps of the second control target device 4. However, there is not the acquired data of the first control target device 3 in the previous process steps of the second control target device 4. Therefore, relating to the sets associated between devices 3 to 6, the works 2 corresponding to the acquired data included in each set are varied between the sets relating to the second control target device 4, the intermediate characteristic measuring device 5 and the final characteristic measuring device 6, and the set relating to the first control target device 3. Thus, it is difficult to highly accurately compare statistics calculated from each set.

The 'removed product' shows the case where the work 2 determined as out-of-specification by the intermediate characteristic measuring device 5, for example, is removed right after its inspection. In this case, relating to the work 2 to be removed, there are the acquired data of the intermediate characteristic measuring device 5 and the acquired data of the first and second control target devices 3 and 4 in the previous process steps of the intermediate characteristic measuring device 5. However, there is not the acquired data of the final characteristic measuring device 6 in the subsequent process steps of the intermediate characteristic measuring device 5. Therefore, relating to the sets associated between devices 3 to 6, the works 2 corresponding to the acquired data included in each set are varied between the sets relating to the first and second control target devices 3 and 4 and the intermediate characteristic measuring device 5, and the set relating to the final characteristic measuring device 6. Thus, it is difficult to highly accurately compare statistics calculated from each set.

As described above, in order to highly accurately conduct the statistical process, desirably, the improper acquired data is removed out of the set. On the other hand, whether to remove the acquired data depends on which types the improper acquired data is and which of the previous process steps or the subsequent process steps the set is included.

Then, in the embodiment, the individual devices 3 to 6 add improper type information that indicates the types of improper data to the acquired data, and sends it to the quality control apparatus 10 to store it in the data storing part 11. Furthermore, the quality control apparatus 10 stores a table shown in FIG. 15 in a storing part, not shown. This table stores the types of the improper acquired data, and information that indicates whether the acquired data is invalid data to be removed or valid data to be left when the sets for the previous process steps or the subsequent process steps are associated.

Then, the scheduler refers to the table shown in FIG. 15 and improper type information stored in the data storing part 11, and removes invalid data out of the acquired data to associate the sets of the acquired data. Therefore, since the improper acquired data can be removed in accordance with the types and which of the previous process steps or the subsequent process steps the data is associated, the statistical processes can be conducted accurately. In addition, when the acquired data does not fall in the improper data, it is processed as valid data. Besides, when the acquired data falls in multiple types of improper data, it is processed as invalid data when it is at least one type fallen in invalid data.

Next, the detail of the specification limit generating part 13 will be described based on FIGS. 7A and 7B. The specification limit generating part 13 extracts a set of the intermediate characteristic data from the intermediate characteristic data storage DB 23 based on the intermediate characteristic extraction timing decided by the scheduler 12, extracts a set of the final characteristic data from the final characteristic data storage DB 25 based on the final characteristic extraction timing decided by the scheduler 12, and generates the specification limits of the intermediate characteristics based on the extracted set. Furthermore, the specification limit generating part 13 sends the generated specification limits to the intermediate characteristic measuring device 5 based on the specification limit switching timing decided by the scheduler 12.

Figure 7A:
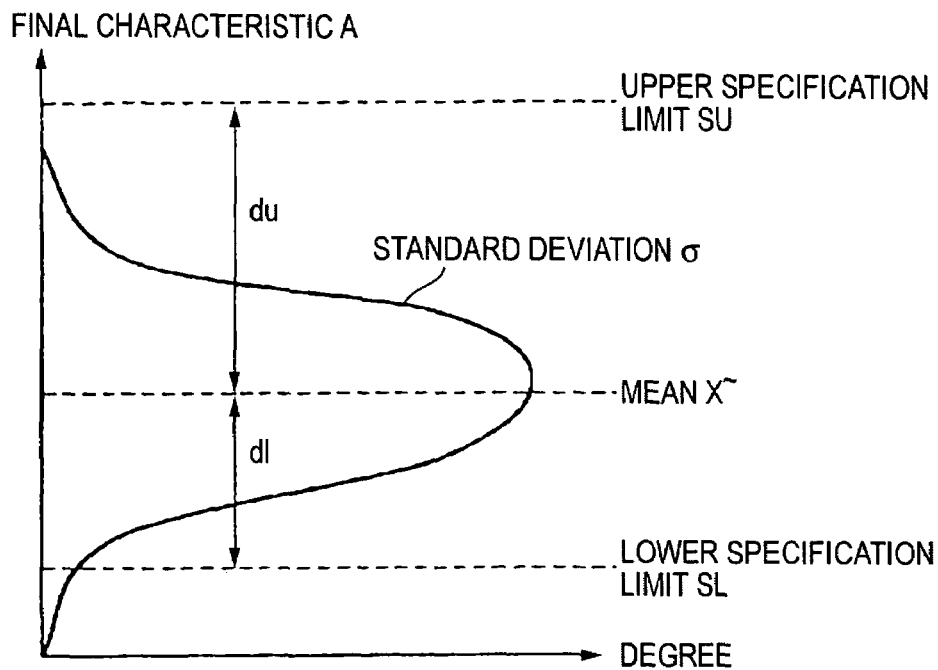
FIG. 7A is a graph illustrating the data distribution of the final characteristic data.
Figure 7B:
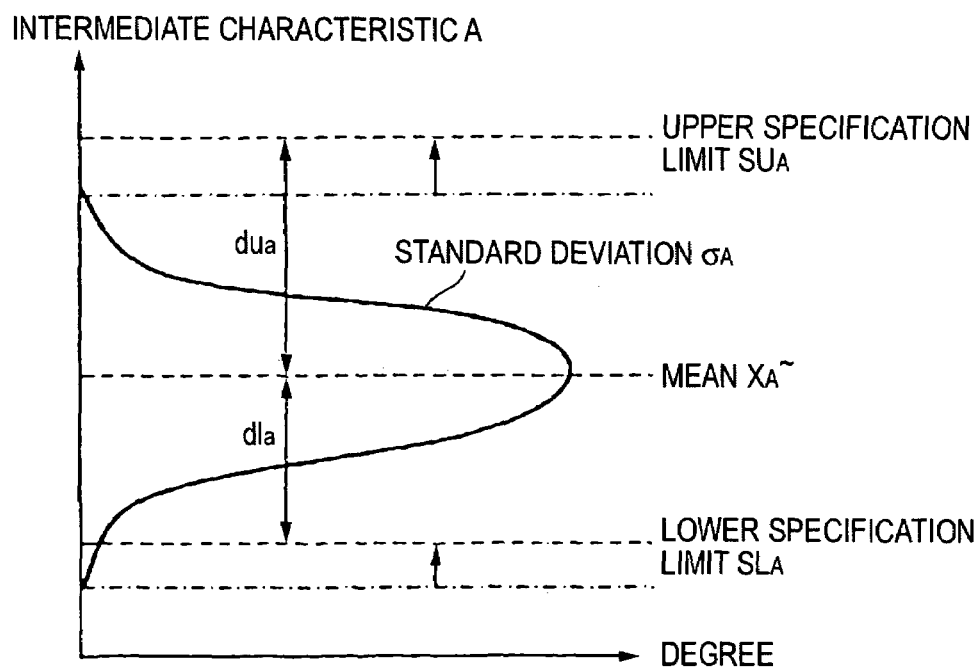
FIG. 7B is a graph illustrating the data distribution of the intermediate characteristic data, showing that specification limits are switched based on the data distribution of the final characteristic data.

FIGS. 7A and 7B show the operation of generating the specification limits. First, as shown in FIG. 7A, the mean value $X^-$ and the standard deviation $\sigma$ relating to the distribution of the extracted final characteristic A are determined. Subsequently, in order to examine the positional relationship of the specification limits with respect to the distribution of the final characteristic A, distances du and dl between the mean value $X^-$ of the distribution of the final characteristic A and the upper and lower specification limits Su and Sl of the final characteristic A is determined from Equation $du=Su-X^-$ and Equation $dl=X^--Sl$. Moreover, as shown in FIG. 7B, the mean value $Xa^-$ and the standard deviation $\sigma a$ relating to the distribution of the extracted intermediate characteristic A are determined.

Subsequently, based on the ratio $\sigma a/\sigma$ of the standard deviation of the intermediate characteristic A to the standard deviation of the final characteristic A and the following equation, the distances du and dl in the final characteristic A are converted to corresponding distances dua and dla in the intermediate characteristic A.

$$dua=du\times(\sigma a/\sigma)=(Su-X^-)\times(\sigma a/\sigma)$$

$$dla=dl\times(\sigma a/\sigma)=(X^--Sl)\times(\sigma a/\sigma)$$

Then, by using the converted distances dua and dla and the mean value $Xa^-$ relating to the distribution of the intermediate characteristic A, the upper and lower specification limits Sua and Sla of the intermediate characteristic A are determined from the following equations as:

$$Sua=Xa^-+dua=Xa^-+(Su-X^-)\times(\sigma a/\sigma)$$

$$Sla=Xa^--dla=Xa^--(X^--Sl)\times(\sigma a/\sigma)$$

The operation of generating the specification limits are repeated with respect to the intermediate characteristics such as the intermediate characteristic B other than the intermediate characteristic A, and thus the specification limit for each is generated. Moreover, when the specification limit is only the upper limit or the lower limit, the specification limit can be generated similarly.

In the meantime, ideally, when all the defectives are removed in the intermediate characteristic inspection, no defective needs to be removed in the final characteristic inspection for the same inspection items. However, in reality, it does not always happen because of disturbance factors and measurement errors.

Besides, when discard costs when defectives are removed in the final characteristic inspection are higher than discard costs when detectives are removed in the intermediate characteristic inspection, removal in the intermediate characteristic inspection reduces the entire production costs on the same inspection items.

Then, desirably, the specification limits of the intermediate characteristics are stricter than the specification limits of the final characteristics. More specifically, the specification limit generating part 13 desirably adjusts the specification limits generated in accordance with the equations based on the safety factor.

Traditionally, the safety factor is three to four experimentally, but it is calculated based on the tolerance design proposed in quality engineering in recent years (for example, see the second and third chapters in Non-patent Document 1). The tolerance design is a method in which quality is converted by the loss function to calculate the optimum tolerance that minimizes the loss.

First, the safety factor to calculate the optimum tolerance is defined by the following equation as:

$$\phi=(A0/A)^{1/2}$$

Here, $\phi$ is the safety factor, A is the discard cost when a defective is removed in the intermediate inspection, and A0 is the discard cost when a defective is removed in the final inspection.

Then, the upper and lower specification limits Sua and Sla of the intermediate characteristic A are adjusted as the following equations as:

$$Sua=Xa^-+dua/\phi=Xa^-+(Su-X^-)\times(\sigma a/\sigma)$$

$$Sla=Xa^--dla/\phi+=Xa^--(X^--Sl)\times(\sigma a/\sigma)$$

In addition, in the embodiment, the above equation is held because the intermediate characteristic is a desired target characteristic as it is closer to the target value as much as possible. When the intermediate characteristic is a smaller desired characteristic as it is closer to 0 as much as possible, the specification limit of the intermediate characteristic is only the upper specification limit Sua between the equations above. Furthermore, when the intermediate characteristic is a greater desired characteristic as it is as great as possible, the specification limit of the intermediate characteristic is only the lower specification limit Sla and is adjusted as the following equation as:

$$Sla=Xa^--dla\times\phi=Xa^--(X^--Sl)\times(\sigma a/\sigma)\times\phi$$

Next, the detail of the impact creating part 14 will be described based on FIG. 8. As described above, the impact creating part 14 creates an impact that indicates how the intermediate characteristics are varied when the control values are switched based on a request from the estimating part 16, sends the created impact to the estimating part 16, and stores it in the impact storage DB 15.

First, the impact creating part 14 sets the initial value for an impact beforehand before the scheduler 12 is operated, and stores it in the impact storage DB 15. By testing beforehand, the initial value for an impact can be determined by calculating a change in the mean value of the controllable factor (control value) and a variation in the mean value and in variations (variance and standard deviation) of the intermediate characteristics with respect to the controllable factor.

Figure 8:
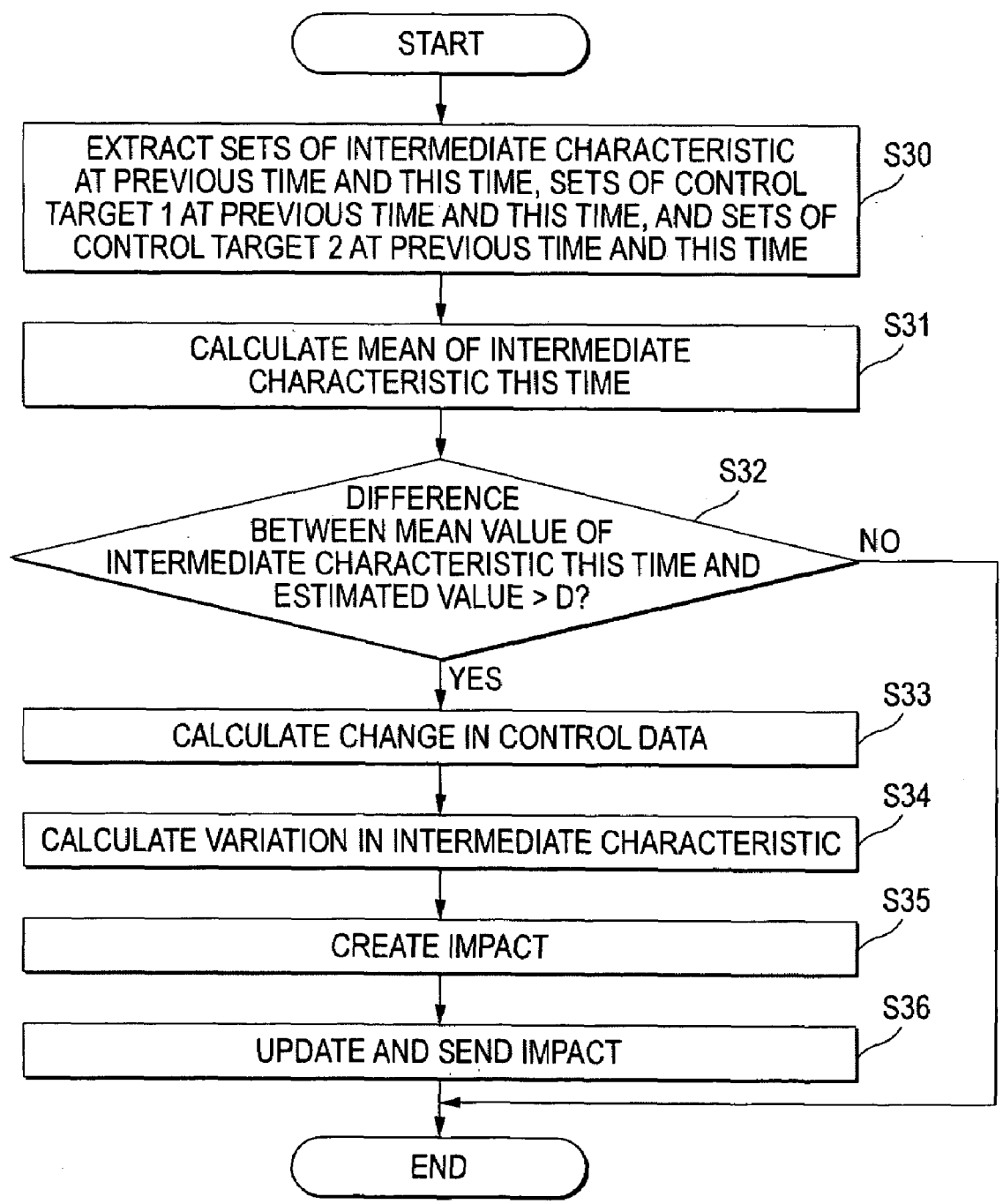
FIG. 8 is a flow chart illustrating the process operation of an impact creating part in the quality control apparatus.

FIG. 8 shows the process operation of the impact creating part 14 after the scheduler 12 is operated. As shown in the drawing, based on the first control value extraction timing at a previous time and this time decided by the scheduler 12, two sets of the control data relating to the first control target device 3 (control target 1) are extracted from the control data storage DB 21 (hereinafter, it is called 'first control data'). Similarly, based on the second control value extraction timing at the previous time and this time decided by the scheduler 12, two sets of the control data relating to the second control target device 4 (control target 2) are extracted from the control data storage DB 21 (hereinafter, it is called 'second control data'). Similarly, based on the intermediate characteristic extraction timing at the previous time and this time decided by the scheduler 12, two sets of the intermediate characteristic are extracted from the intermediate characteristic data storage DB 23 (S30).

Subsequently, the mean value of the set of the intermediate characteristic extracted at this time is calculated (S31), and it is determined whether the difference between the calculated mean value and the estimated value of the mean value of the intermediate characteristic acquired from the estimating part 16 is greater than a predetermined value D (S32). When it is greater (YES at S32), the following process operation is conducted, whereas it is not greater (NO at S32), the process operation of the impact creating part 14 is ended.

Then, a change this time with respect to a change at the previous time is calculated with respect to the mean value of the control data (S33). More specifically, the mean value relating to the set of the first control data (measurement value) extracted based on the first control value extraction timing at the previous time is $X(n-1)$, and the mean value relating to the set of the first control data (measurement value) extracted based on the first control value extraction timing this time is $X(n)$. Then, a change this time relating to the mean value of the first control data with respect to that at the previous time is expressed by the following equation.

(a change in the mean value of the first control data)=$X(n)-X(n-1)$.

Subsequently, a variation this time with respect to that at the previous time is calculated relating to the mean value and variance of the intermediate characteristic (S34). More specifically, the mean value and variance relating to the set of the intermediate characteristic A extracted based on the intermediate characteristic extraction timing at the previous time are $Y(n-1)$ and $Z(n-1)$, respectively, and the mean value and variance relating to the set of the intermediate characteristic A extracted based on the intermediate characteristic extraction timing this time are $Y(n)$ and $Z(n)$, respectively. Then, relating to the mean value and variance of the intermediate characteristic A, the variation this time with respect to that at the previous time is expressed by the following equations as:

(a variation in the mean value of the intermediate characteristic $A$)=$Y(n)-Y(n-1)$ (a variation in the variance of the intermediate characteristic $A$)=$Z(n)-Z(n-1)$ Subsequently, the variations in the mean value and variance of the intermediate characteristic are normalized by a change in the mean value of the first control data, and thus impacts for the mean value and variance of the intermediate characteristic are created (S35). More specifically, an impact k1 for the mean value of the intermediate characteristic A and an impact k2 for the variance of the intermediate characteristic A are expressed by the following equations as:

$k1=(Y(n)-Y(n-1)/(X(n)-X(n-1))$ $k2=(Z(n)-Z(n-1)/(X(n)-X(n-1))$

The procedures are used to also determine an impact caused by the second control data and an impact on the other intermediate characteristic B. More specifically, in practice, the following is to be created: impacts on the mean value and variance of the intermediate characteristic A by the first control data, impacts on the mean value and variance of the intermediate characteristic A by the second control data, impacts on the mean value and variance of the intermediate characteristic B by the first control data, and impacts on the mean value and variance of the intermediate characteristic B by the second control data.

Then, the created impacts are sent to the estimating part 16, the impacts stored in the impact storage DB 15 are updated (S36), and the operation of the impact creating part 14 is ended.

Figure 9:
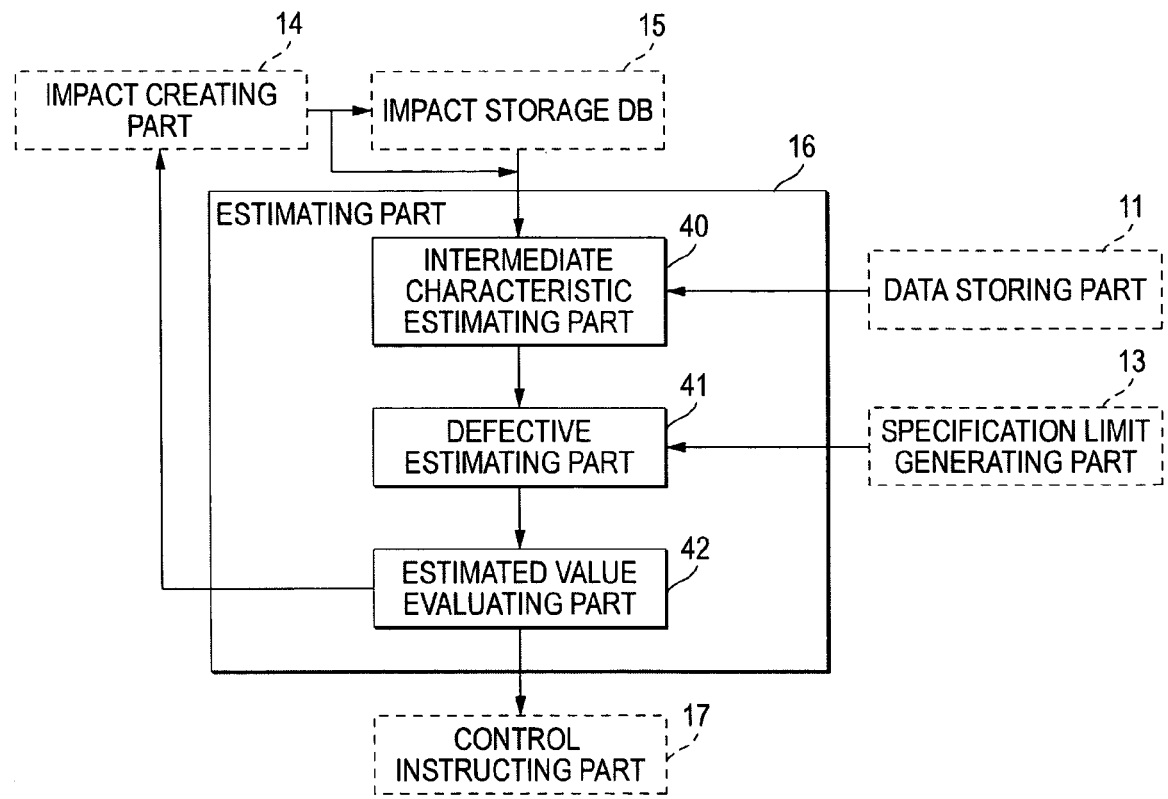
FIG. 9 is a functional block diagram illustrating the schematic configuration of an estimating part in the quality control apparatus.

Next, the detail of the estimating part 16 will be described based on FIGS. 9 to 13. FIG. 9 shows the schematic configuration of the estimating part 16. As shown in the drawing, the estimating part 16 is configured to have an intermediate characteristic estimating part (intermediate characteristic estimating module) 40, a defective estimating part (defective number estimating module) 41, and an estimated value evaluating part (variation deciding module) 42.

The intermediate characteristic estimating part 40 uses the impact read out of the impact storage DB 15 to estimate a variation in the mean value or the standard deviation (variance) of the intermediate characteristic when the set value of the control value is switched. The defective estimating part 41 estimates the number of defectives when the distribution of the intermediate characteristic is varied by the variation estimated by the intermediate characteristic estimating part 40, and evaluates by the sum of the number of individual defectives. The estimated value evaluating part 42 determines a variation in the set value of the control value when the number of defectives is the minimum, and sends it to the control instructing part 17.

Figure 10:
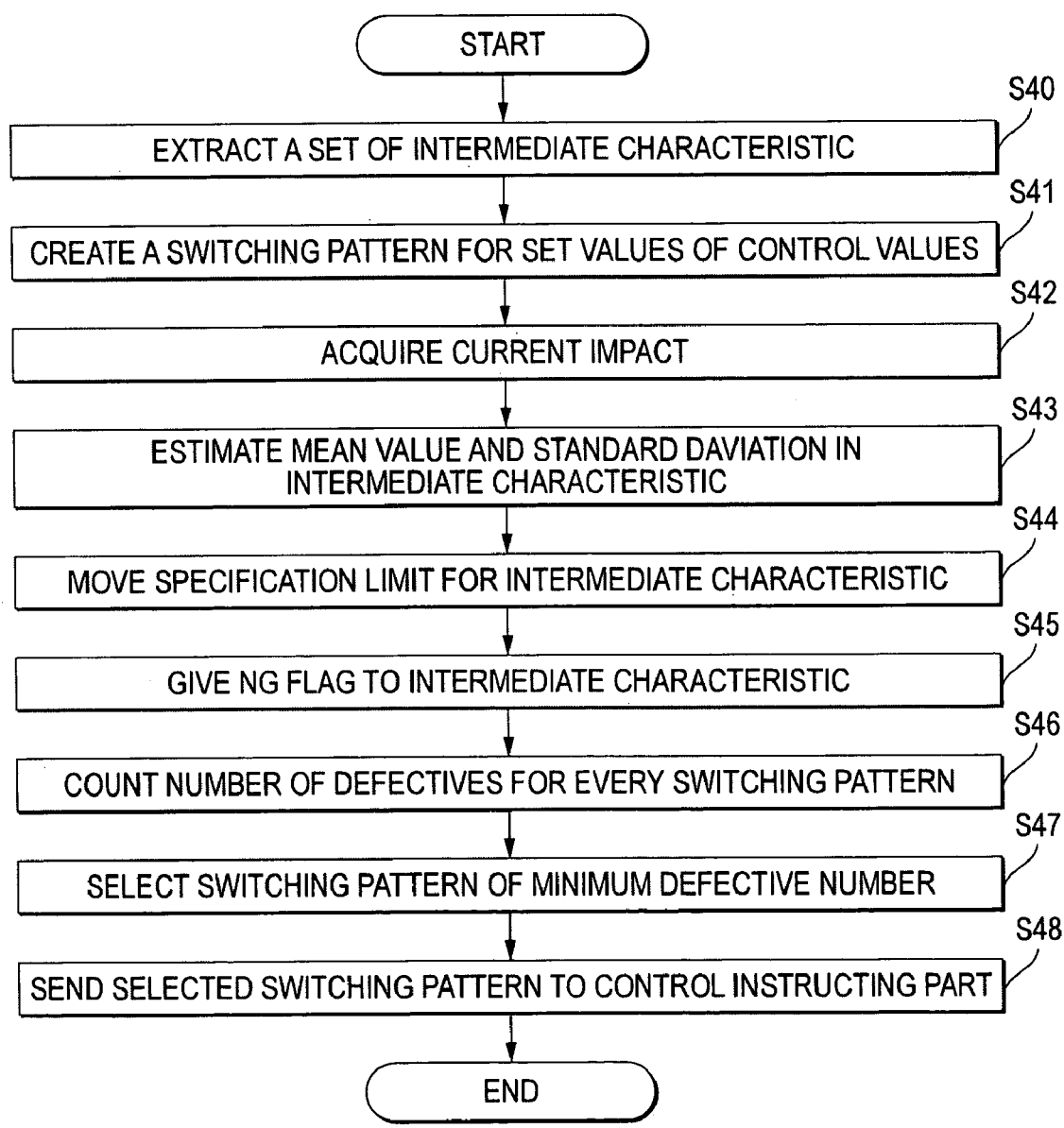
FIG. 10 is a flow chart illustrating the process operation of the estimating part.

FIG. 10 shows the process operation of the estimating part 16 of the configuration. First, the intermediate characteristic estimating part 40 extracts a set of the intermediate characteristic data from the intermediate characteristic data storage DB 23 of the data storing part 11 based on the intermediate characteristic extraction timing decided by the scheduler 12 (S40).

Subsequently, the intermediate characteristic estimating part 40 creates a switching pattern that is a combination of the switching amount of the set values of the control values relating to the individual control target devices 3 and 4 (S41). FIG. 11 shows an example of the switching pattern in a table form. In the embodiment, since the control targets are two devices, the control target devices 3 and 4, the switching pattern is expressed by a two-dimensional table as shown in FIG. 11. In addition, the number of the switching amounts for the set values of the control values can be experimentally decided from the switching margin possibly effective and the tolerance of the switching margin, but it can be decided by any manners.

In the embodiment, as shown in FIG. 11, the number of the switching amounts is five in the control target 1 (control target device 3) and the control target 2 (control target device 4). Furthermore, the switching margin for the control target 1 is 0.003, and the switching margin for the control target 2 is 0.005. Moreover, as shown in FIG. 11, 0.000, that is, 'not switching' is included in the switching amount in the embodiment, but it is not necessarily included.

Subsequently, the mean value of the intermediate characteristic or the estimated value of the standard deviation when the set values of the control values are switched is determined with respect to each of the switching patterns, and thus the estimated value table shown in FIG. 11 is completed. More specifically, the current impact is acquired from the impact storage DB 15 (S42), and the acquired impact is multiplied by the switching margin (switching amount) for the set value of the control value. Therefore, the mean value or the variation in the variance of the intermediate characteristic is determined when the set value of the control value is switched.

Furthermore, it is fine to use only one of the mean value and variance of the intermediate characteristic or to use both. Moreover, it is acceptable to use the standard deviation as showing variations instead of variance. Hereinafter, the mean value and the standard deviation of the intermediate characteristic are used.

Subsequently, the variation is added to the mean value or variance of the extracted current intermediate characteristic. Moreover, as for the variance, the square root is taken after this and converted to standard deviation. By these calculations, the estimated value of the mean value or the standard deviation of the intermediate characteristic is determined for each combination of the switching amount for the set values of the control values for the control target, and the estimated value table shown in FIG. 11 is competed (S43). Besides, FIG. 11 shows the estimated value Xa, i, j for the mean value.

Here, the switching margin for the set value of the control value is $\alpha$, the mean value of the intermediate characteristic A is $X^-$, the standard deviation of the intermediate characteristic A is $\sigma$, an impact for the mean value of the intermediate characteristic A is k1, and an impact for the variance of the intermediate characteristic A is k2. The estimated values $xa\hat{}$ and $\sigma\hat{}$ of the mean value and the standard deviation of the intermediate characteristic A when the set values of the control values are switched are the following equations as:

$$Xa\hat{} = k1 \times \alpha + X^-$$

$$\sigma a\hat{} = (k2 \times \alpha + \sigma^2)^{1/2}$$

Then, the defective estimating part 41 uses the estimated value determined by the intermediate characteristic estimating part 40 to create the distribution of the intermediate characteristic after switched for every switching pattern, and estimates the number of defectives for the intermediate characteristic. More specifically, the specification criteria (specification limits) are moved by the change in the created distribution of the intermediate characteristic (S44), and it is determined whether elements (individual intermediate characteristics) included in the extracted set are passed or failed (S45).

Moving the specification criteria for the intermediate characteristic A is the following equations as described above relating to the specification limit generating part 13 as:

$$Sua = Xa^- + dua = Xa^- + (Su - X^-) \times (\sigma a/\sigma)$$

$$Sla = Xa^- - dla = Xa^- - (X^- - Sl) \times (\sigma a/\sigma)$$

As described above, $Xa^- = Xa\hat{} = k1 \times \alpha + X^-$, and $\sigma a = \sigma a\hat{} = (k2 \times \alpha + \sigma^2)^{1/2}$, and thus the upper specification limit and the lower specification limit after moved are the following equations (S44) as:

$$Sua = k1 \times \alpha + X^- + (Su - X^-) \times (k2 \times \alpha + \sigma^2)^{1/2}/\sigma$$

$$Sla = k1 \times \alpha + X^- - (X^- - Sl) \times (k2 \times \alpha + \sigma^2)^{1/2}/\sigma$$

These specification limits Sua and Sla are used to determine whether the set of the intermediate characteristic A extracted this time is passed or failed, and the NG flag is given to data for those determined as defectives (S45). The process above is similarly performed with respect to the individual intermediate characteristics, and thus a passed/failed list for the intermediate characteristics is created. FIG. 12 shows an example of the passed/failed list. In the drawing, those with 'NG' in the column of 'passed/failed' indicate that the NG flag is given to each intermediate characteristic. In addition, in the case of the drawing, the intermediate characteristics are three types (A to C).

Subsequently, the estimated value evaluating part 42 sums the number of defectives for the individual intermediate characteristics determined by the defective estimating part 41 (S46), and selects the switching pattern that the summed number of defectives is the minimum (S47). Here, it is noted that when the NG flag is generated in multiple intermediate characteristics, it is necessary not to count the number of defectives as overlapped when summed.

Then, the priority of the intermediate characteristics relating to being passed or failed is determined beforehand, and only the NG flag of higher priority is counted. Furthermore, any manners to determine the priority are acceptable. For example, in the case of the passed/failed list shown in FIG. 12, the NG flags are overlapped at production numbers 93 and 95. At this time, suppose the priority for the intermediate characteristics is A>B>C, the sum of the number of defectives=the number of defectives for A+the number of defectives for B+the number of defectives for C=2+1+0=3.

Moreover, desirably, the NG flag is indicated as bit data as 1 (ON) when it is given, whereas 0 (OFF) when it is not given. In this case, the logical OR (OR) is taken with respect to the NG flags of the intermediate characteristics A to C for every production number, and the flags are counted to determine the sum of the number of defectives.

The estimated value evaluating part 42 calculates the total sum of the number of defectives (the total number of defectives) for every switching pattern, and thus a total defective number table corresponding to the estimated value table is created. FIG. 13 shows an example of the total defective number table, which corresponds to the estimated value table shown in FIG. 11. The estimated value evaluating part 42 refers to the total defective number table to select the switching pattern that the total number of defectives is the minimum. In the case of FIG. 13, a combination that the switching amount for the set value of the control value of the control target 1 (control target device 3) being 0.003 with the switching amount for the set value of the control value of the control target 2 (control target device 4) being 0.010 is the minimum by the total number of defectives being 15, and thus this switching pattern is selected.

Then, the estimated value evaluating part 42 sends the selected switching pattern (the combination of the switching amounts) to the control instructing part 17 (S48). Furthermore, it sends the estimated value of the intermediate characteristic corresponding to the selected switching pattern to the impact creating part 14. After that, the operation of the estimating part 16 is ended.

Moreover, the switching pattern that the total number of defectives is the minimum is selected, and consequently it can be considered that the switching amount for one of control targets 1 and 2 or for both is 0.000, that is, switching is unnecessary. In this case, sending the switching amount for this control target can be omitted to the control instructing part 17.

The control instructing part 17 acquires the combination for every control target relating to the switching pattern selected by the estimated value evaluating part 42, that is, the switching amounts for the set values of the control values, switches the set value of the control value of each of the control target devices 3 and 4 based on the acquired switching pattern, and sends the switched set values as control instructions to the control target devices 3 and 4. For example, it is fine that the set value of the control value is switched in accordance with the following equation as:

(the set value of the control value this time)=(the set value of the control value at the previous time)+(the switching amount for the set value of the control value that the number of defectives is the minimum).

The invention is not limited to the embodiment, which can be modified variously within the scope of the teachings in the claims. More specifically, embodiments obtained by combining technical modules properly modified within the scope of the teachings in the claims are also included in the technical scope of the invention.

For example, it can be considered that there is a slight time lag between the time to instruct switching the set value of the control value and the specification limit of the intermediate characteristic and the time for actually switching by the individual devices 3 to 5. Furthermore, it can be considered that there is a slight time lag between the time to measure by the individual devices 3 to 6 and the time to acquire the various measurement values by the quality control apparatus 10. Therefore, the scheduler 12 desirably adjusts these time lags as well to decide the association of data and timing.

Moreover, the data storing part 11 stores the acquired time in the embodiment, but it is fine that it receives the measured time that is the time measured by the individual devices 3 to 6 from each device for storing. In this case, the scheduler 12 is to use the measured time for association.

Besides, two devices, the control target devices 3 and 4, and a single intermediate characteristic measuring device 5, are used in the embodiment, but a single control target device can be used, and the control target device and the intermediate characteristic measuring device can be further increased.

In addition, it is fine that each block of the quality control apparatus 10 is configured of hardware logic and is implemented by software with a CPU as below.

More specifically, the quality control apparatus 10 has a CPU which executes instructions of a control program for implementing each function, a ROM which stores the program, a RAM which runs the program, and a storage device (recording medium) such as memory which stores the program and various items of data. The object of the invention can also be achieved in which a recording medium that the program codes of the control program of the quality control apparatus 10 (an execute form program, an intermediate code program, and a source program), which is software for implementing the functions, are readable by a computer is supplied to the quality control apparatus 10 and the computer (or the CPU or MPU) reads the program codes recorded in the recording medium for execution.

For the recording medium, for example, the following can be used: tapes such as magnetic tape and cassette tape, disks including magnetic disks such as a flexible disk and a hard drive, and optical disks such as CD-ROM, MO, MD, DVD and CD-R, cards such as an IC card (including a memory card) and an optical card, or semiconductor memory such as mask ROM, EPROM, EEPROM and flash ROM.

Furthermore, it is fine that the quality control apparatus 10 is configured to be connectable to a communication network and the program codes are supplied through the communication network. The communication network is not defined particularly. For example, the following can be used: the Internet, an intranet, an extranet, LAN, ISDN, VAN, a CATV communications network, a virtual private network, a telephone network, a mobile communications network, and a satellite communications network. Moreover, transmission media to configure the communication networks are not limited particularly. For example, the following can be used: cables such as IEEE 1394, USB, electric power line transmission, cable TV lines, telephone lines, and ADSL lines, or radio such as infrared rays including IrDA or remote control, Bluetooth (trade mark), 802.11 radio, HDR, mobile telephone networks, satellite connections, and terrestrial digital networks. Besides, the invention can be implemented in the forms of carrier waves that implement the program codes to be electronically transmitted, or of data signal rows.

The quality control apparatus according to the invention can be applied to devices that control various processes to maintain proper conditions such as control over household electrical products, in addition to manufacturing processes.

What is claimed is:

1. A quality control apparatus which controls a manufacturing process in order to manufacture products of predetermined quality, the apparatus comprising:
    a collecting and storing module which collects measurement data measured by multiple measuring devices disposed in a manufacturing process and stores the collected measurement data along with measured time or collected time;
    an associating module which associates the measurement data of the multiple measuring devices in consideration of dead time generated between the measuring devices at measured time or collected time; and
    a quality determining module for determining whether the measurement data is within a specification limit during the manufacturing process.

2. The quality control apparatus according to claim 1, wherein the associating module associates given numbers of items of measurement data of the multiple measuring devices.

3. The quality control apparatus according to claim 1, wherein when improper measurement data is included in the measurement data to be associated, the associating module stops association of the improper measurement data with the other measurement data that corresponds to the improper measurement data.

4. The quality control apparatus according to claim 3, wherein when improper measurement data is produced and then an intermediate product is put back at a certain process step in a manufacturing process, the associating module stops association of measurement data relating to the intermediate product on an upstream side of the process step with measurement data relating to the intermediate product at the process step and on a downstream side thereof.

5. The quality control apparatus according to claim 3, wherein when improper measurement data is produced and then an intermediate product removed at a certain process step in a manufacturing process, the associating module stops association of measurement data on a downstream side of the process step with measurement data relating to the intermediate product at the process step and on an upstream side thereof.

6. A computer readable recording medium on which a quality control program which operates the quality control apparatus according to claim 1, and functions a computer as the individual modules is recorded.

7. The quality control apparatus according to claim 1, wherein the quality determining module also determines whether the measurement data is within a specification limit after the manufacturing process.

8. A quality control apparatus which controls a manufacturing process in order to manufacture products of predetermined quality, the apparatus comprising:
   a collecting and storing module which collects and stores intermediate characteristic data of an intermediate product measured by an intermediate characteristic measuring device and final characteristic data of a completed product measured by a final characteristic measuring device;
   a specification limit generating module which generates an intermediate characteristic specification limit set to the intermediate characteristic measuring device based on a data distribution of the final characteristic data stored in the collecting and storing module and a final characteristic specification limit set to the final characteristic measuring device;
   a specification limit setting control module which controls the intermediate characteristic measuring device so as to set the generated specification limit generated by the specification limit generating module; and
   a quality determining module for determining whether the measurement data is within the generated specification limit during the manufacturing process.

9. The quality control apparatus according to claim 8, wherein the specification limit generating module generates the intermediate characteristic specification limit based on a differential between a mean value of the data distribution of the final characteristic data and the final characteristic specification limit.

10. The quality control apparatus according to claim 9, wherein the specification limit generating module generates the intermediate characteristic specification limit so that a ratio of a differential between a mean value of a data distribution of the intermediate characteristic data stored in the collecting and storing module and the intermediate characteristic specification limit with respect to the differential between the mean value of the data distribution of the final characteristic data and the final characteristic specification limit is a ratio of a variation value of the data distribution of the intermediate characteristic data with respect to a variation value of the data distribution of the final characteristic data.

11. The quality control apparatus according to claim 8, wherein the specification limit generating module further generates the intermediate characteristic specification limit based on a safety factor.

12. The quality control apparatus according to claim 11, wherein the safety factor is calculated based on discard cost when the completed product is removed based on the final characteristic specification limit and discard cost when the intermediate product is removed based on the intermediate characteristic specification limit.

13. The quality control apparatus according to claim 8, wherein the collecting and storing module stores the intermediate characteristic data and the final characteristic data along with measured time or collected time, the apparatus further comprising:
   an associating module which associates the intermediate characteristic data with the final characteristic data in consideration of dead time generated between the intermediate characteristic measuring device and the final characteristic measuring device at measured time or collected time.

14. The quality control apparatus according to claim 8, wherein the specification limit generating module generates a subsequent specification limit by using the intermediate characteristic data and the final characteristic data collected by the collecting and storing module after a given time period has elapsed from when the specification limit setting control module controlled the intermediate characteristic measuring device.

15. The quality control apparatus according to claim 8, wherein the quality determining module also determines whether the measurement data is within the generated specification limit after the manufacturing process.

16. A quality control apparatus which controls a control target device disposed in a manufacturing process in order to manufacture products of predetermined quality, the apparatus comprising:
   a collecting and storing module which collects and stores a set value of a control value set as a target value to the control target device, control data that is a measurement value of the control value measured by the control target device with respect to the set value, and intermediate characteristic data of an intermediate product measured by an intermediate characteristic measuring device;
   an intermediate characteristic estimating module which estimates a variation in a data distribution of the intermediate characteristic data when the set value of the control value stored in the collecting and storing module is switched;
   a defective number estimating module which estimates a number of defectives based on a variation in the data distribution of the intermediate characteristic data estimated by the intermediate characteristic estimating module and an intermediate characteristic specification limit;
   a switching amount deciding module which decides a switching amount for the set value of the control value so that the number of defectives estimated by the defective number estimating module is the minimum;
   a control switching module which switches the set value of the control value of the control target device based on the switching amount decided by the switching amount deciding module; and a quality determining module for determining whether the intermediate characteristic data is within the intermediate characteristic specification limit during the manufacturing process.

17. The quality control apparatus according to claim 16, further comprising an impact storing module which stores an impact that indicates a degree of a variation in the data distribution of the intermediate characteristic data with respect to a change in a mean value of the control data,
wherein the intermediate characteristic estimating module estimates the variation in the data distribution of the intermediate characteristic data based on the switching amount for the set value of the control value stored in the collecting and storing module and the impact stored in the impact storing module, and
the switching amount deciding module decides a switching amount for the set value of the control value so that the number of defectives estimated by the defective number estimating module is the minimum.

18. The quality control apparatus according to claim 17, further comprising an impact creating module which creates the impact and stores it in the impact storing module when a difference more than a given amount is generated between the data distribution of the intermediate characteristic data corresponding to a switching amount for the set value of the control value decided by the switching amount deciding module and the distribution of the intermediate characteristic data collected by the collecting and storing module after the control switching module switches control.

19. The quality control apparatus according to claim 16, wherein the collecting and storing module further collects and stores final characteristic data of a completed product measured by a final characteristic measuring device, the apparatus further comprising:
a specification limit generating module which generates an intermediate characteristic specification limit set to the intermediate characteristic measuring device based on a data distribution of the final characteristic data stored in the collecting and storing module and a final characteristic specification limit set to the final characteristic measuring device, and
the defective number estimating module uses the intermediate characteristic specification limit generated by the specification limit generating module.

20. The quality control apparatus according to claim 16, wherein the collecting and storing module stores the control data and the intermediate characteristic data along with measured time or collected time, the apparatus further comprising:
an associating module which associates the control data with the intermediate characteristic data in consideration of dead time generated between the control target device and the intermediate characteristic measuring device at measured time or collected time.

21. The quality control apparatus according to claim 16, wherein the intermediate characteristic estimating module estimates a subsequent data distribution of the intermediate characteristic data by using the intermediate characteristic data collected by the collecting and storing module after a given time period has elapsed from when the control switching module switched control.

22. The quality control apparatus according to claim 16, wherein the quality determining module also determines whether the intermediate characteristic data is within the intermediate characteristic specification limit after the manufacturing process.

23. A control method of a quality control apparatus which controls a manufacturing process in order to manufacture products of predetermined quality, comprising:
a collecting and storing step which collects measurement data measured by multiple measuring devices disposed in a manufacturing process and stores the collected measurement data along with measured time or collected time,
an association step of associating the measurement data of the measuring devices with each other in consideration of dead time generated between the measuring devices at measured time or collected time; and
a quality determining step for determining whether the measurement data is within a specification limit during the manufacturing process.

24. The quality control apparatus according to claim 23, wherein the quality determining module also determines whether the measurement data is within a specification limit after the manufacturing process.

25. A control method of a quality control apparatus which controls a manufacturing process in order to manufacture products of predetermined quality, comprising:
a collecting and storing step which collects and stores intermediate characteristic data of an intermediate product measured by an intermediate characteristic measuring device and final characteristic data of a completed product measured by a final characteristic measuring device,
a specification limit generating step of generating an intermediate characteristic specification limit set to the intermediate characteristic measuring device based on a data distribution of the final characteristic data stored in the collecting and storing step and a final characteristic specification limit set in the final characteristic measuring device; and
a specification limit setting control step of controlling the intermediate characteristic measuring device so as to set the specification limit generated at the specification limit generating step; and
a quality determining step for determining whether the measurement data is within the generated specification limit during the manufacturing process.

26. The quality control apparatus according to claim 25, wherein the quality determining module also determines whether the measurement data is within the generated specification limit after the manufacturing process.

27. A control method of a quality control apparatus which controls a control target device disposed in a manufacturing process in order to manufacture products of predetermined quality, comprising:
a collecting and storing step which collects and stores a set value of a control value set as a target value to the control target device, control data that is a measurement value of a control value measured by the control target device with respect to the set value of the control value, and intermediate characteristic data of an intermediate product measured by an intermediate characteristic measuring device, and
an intermediate characteristic estimating step of estimating a variation in a data distribution of the intermediate characteristic data when the set value of the control value stored in the collecting and storing step is switched;
a defective number estimating step of estimating a number of defectives based on the variation in the data distribution of the intermediate characteristic data estimated at the intermediate characteristic estimating step and an intermediate characteristic specification limit;

a switching amount deciding step of deciding a switching amount for the set value of the control value so that the number of defectives estimated at the defective number estimating step is the minimum;

a control switching step of switching the set value of the control value of the control target device based on the switching amount decided at the switching amount deciding step; and a quality determining step for determining whether the intermediate characteristic data is within the intermediate characteristic specification limit during the manufacturing process.

28. The quality control apparatus according to claim 27, wherein the quality determining module also determines whether the intermediate characteristic data is within the intermediate characteristic specification limit after the manufacturing process.

* * * * *